Feb. 10, 1970 H. M. LEONHARDT ET AL 3,493,983

APPLICATION OF A RIB TO AN INSOLE

Filed Aug. 14, 1968 17 Sheets-Sheet 1

INVENTORS
Horst M. Leonhardt
Jacob S. Kamborian Jr.
BY Albert Gordon
ATT'Y

APPLICATION OF A RIB TO AN INSOLE

Feb. 10, 1970 H. M. LEONHARDT ET AL 3,493,983

APPLICATION OF A RIB TO AN INSOLE

Filed Aug. 14, 1968 17 Sheets-Sheet 4

Feb. 10, 1970 H. M. LEONHARDT ET AL 3,493,983

APPLICATION OF A RIB TO AN INSOLE

Filed Aug. 14, 1968 17 Sheets-Sheet 6

APPLICATION OF A RIB TO AN INSOLE

Filed Aug. 14, 1968 17 Sheets-Sheet 7

Feb. 10, 1970 H. M. LEONHARDT ET AL 3,493,983

APPLICATION OF A RIB TO AN INSOLE

Filed Aug. 14, 1968 17 Sheets-Sheet 15

United States Patent Office 3,493,983

Patented Feb. 10, 1970

3,493,983

APPLICATION OF A RIB TO AN INSOLE

Horst M. Leonhardt, Boston, and Jacob S. Kamborian, Jr., Duxbury, Mass., assignors, by direct and mesne assignments, to Jacob S. Kamborian, Jr., Duxbury, Mass.

Filed Aug. 14, 1968, Ser. No. 752,589
Int. Cl. A43d *43/06*
U.S. Cl. 12—20 61 Claims

ABSTRACT OF THE DISCLOSURE

An apparatus for feeding an insole past a work-performing station where a rib is adhesively applied thereto. The apparatus includes means for automatically rotating the insole as it is fed past the work-performing station to vary the position on the insole at which the rib is to be applied. A rib forming unit is also provided which shapes the rib to its desired configuration from a strip of material that is precoated on one side thereof with a thermoplastic adhesive.

In the illustrative embodiment of the invention an insole rib is fabricated in a rib forming unit from a strip of suitable material, such as cotton duck, having a coating of thermoplastic or other heat-softenable adhesive deposited on one side thereof. After passing through the rib forming unit the rib is guided to a rib feeding unit which incorporates a number of guideways and rolls through and about which the rib is threaded. A drive roll is incorporated into the rib feeding unit and is cooperative with an idler roll to grip and feed an insole therebetween. The rib is guided in the rib feeding unit to and about the drive roll so that it may be sandwiched between the drive roll and the insole thereby feeding and pressing the rib and insole together. A heater block is provided in the rib feeding unit and is cooperative with the drive roll to press the rib to the drive roll while simultaneously applying heat to the thermoplastic coated surface of the rib, the heater block being disposed as close as possible to the point of engagement of the drive and idler rolls with the rib and insole.

The drive and idler rolls cooperate to press the insole and heat-activated rib into adhesion while feeding them in a substantially linear direction of feed. Means are incorporated in the machine for forcibly rotating the insole during the substantially linear feeding thereof so as to vary the position on the insole to which the rib is applied. The construction of drive and idler rolls is such as to enable the insole to be so rotated about a pivot point that is disposed between the drive and idler rolls. The means for effecting rotation of the insole in this manner include a pair of thrusters that are mounted to the machine so as to be at the level of the workpiece when the workpiece is gripped by the drive and idler rolls. The thrusters are guided for movement along an endless circuitous path that circumscribes the pivot point. The path along which the thrusters are movable is of a configuration such that at least one of the thrusters may be maintained in engagement with the periphery of the insole at any given time during the cycle of operation. The configuration of the path is thus determined by the contour and size of the insole. Drive means are associated with the thrusters to effect their movement along the path in either direction about said pivot point.

A thruster control unit is operatively associated with the thruster drive means and is sensitive to a signal transmitted thereto to effect actuation of the thruster drive means so as to urge the thrusters in either direction along heir path of movement. Signals for operation of the thruster control means are directed thereto from two sources. One of the sources comprises an edge gage that is disposed at the level of the fed insole and is adapted to engage a portion of the periphery of the insole just before that portion of the insole is drawn between the drive and idler rolls. The edge gage is biased towards the insole so that it may be maintained in contact with the periphery thereof at all times. Due to the varying contour of the periphery of the insole and the feeding thereof by the drive and idler rolls along the substantially linear direction of feed, it may be seen that the edge gage may be urged forwardly or rearwardly depending on the change in contour of the insole as it is presented to the edge gage. The extent and direction of urging of the edge gage is transmitted to the thruster control means so as to actuate the thruster control means and cause a corresponding desired movement of the thrusters. In general the cooperation between the edge gage, thruster control unit, and thruster drive means is such that when the edge gage is urged in one direction the thrusters will tend to rotate to cause the insole to rotate in the opposite direction thereby tending to relieve the force imparted to the edge gage. The effect of this is to maintain substantially constant the marginal distance between the edge of the insole and the point at which the rib is attached.

Inasmuch as it is frequently desirable in the manufacture of shoes to vary the marginal distance between the edge of the insole and the location of the rib, a margin control unit is provided to generate a predetermined independent signal which is transmitted to the thruster control unit. This independent signal is cam generated and is operative to actuate the thruster control unit irrespective of the contour of the periphery of the insole. The margin control unit includes a cam and a cam follower, the movement of the cam follower being transmitted to the thruster control unit. The relationship between the signal caused by the movement of the edge gage and the signal caused by the movement of the cam follower is such that, although the edge gage may be urged in a direction that would ultimately cause rotation of the thrusters in one direction, the signal transmitted to the thruster control unit by the margin control unit may be such as to render the urging of the edge gage ineffective, the effect of which would be to preclude this rotation of the thrusters and possibly cause the thrusters to rotate in the opposite direction thus causing a variance in the width of the margin upon continued feeding of the insole along the direction of feed.

The insole and rib are attached and fed in this manner until, towards the end of the cycle of operation of the machine, clamping means and cutting means are operative to respectively clamp and cut the rib. The clamping and cutting means are incorporated into the rib feeding unit and are disposed along the path of movement of the rib therethrough in advance of the drive roll. Means are further provided for advancing the leading end of the severed rib from the cutting means to the drive roll so as to be in readiness to be applied to the next insole that is introduced to the machine.

The invention will now be described in detail with reference to the accompanying drawings wherein.

As used herein the term "strip S" will refer to the material from which the rib is to be formed, but before the rib R is formed to its final cross-sectional configuration and the term "rib R" will refer to the material after it has been precision folded to its final configuration.

Figure 1:
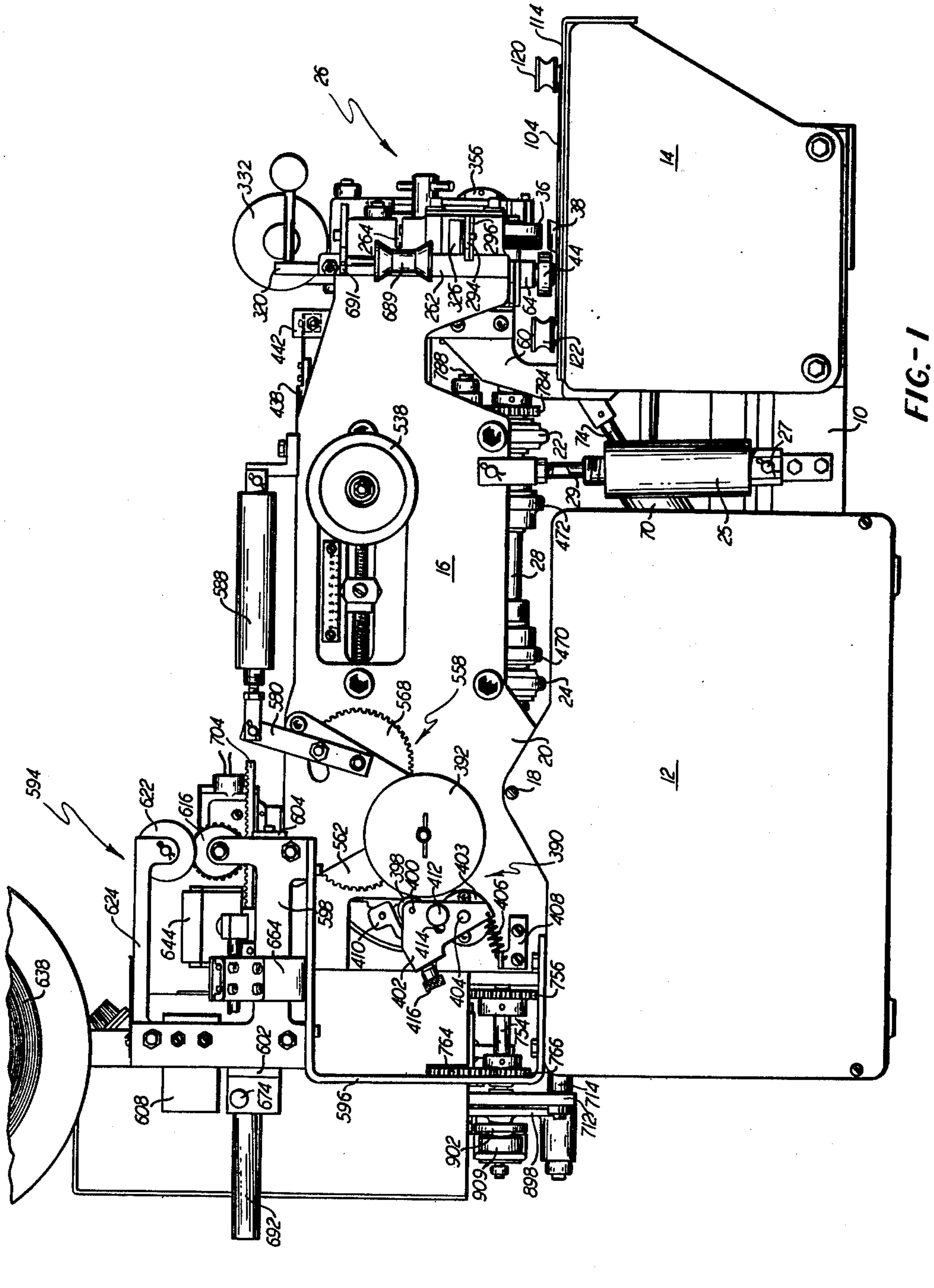
FIGURE 1 is a side elevation of the machine.

When operating the machine the operator is intended to be to the right of the machine as seen in FIGURE 1. Directions that are towards and away from the operator will be respectively referred to as forwardly and rearwardly. Directions that extend to the left or right of the operator will be referred to as lateral.

Referring to FIGURE 1 it may be seen that the machine includes a main frame 10 to which is secured a rearward housing 12 and a forward housing 14. A head 16 is pivotally mounted to the rearward housing 12 at the pins 18 and extends forwardly therefrom such that the forward end of the head 16 is disposed above the forward housing 14. As may be seen from FIGURE 2 the head 16 includes a pair of side walls 20, 21 which are rigidified by means of a forward bulkhead 22 and a rearward bulkhead 24. Mounted to the forward end of the head 16 and disposed above the forward housing 14 is a rib-feeding unit 26 that is adapted to simultaneously feed an insole rib R and an insole I (FIGURE 56) past an attaching station at which the rib R is secured to the insole I. An air operated motor 25 is pivoted at the pin 27 to the frame 10 and has a piston rod 29 that is pivoted to the head 16 so that the head 16 and all the mechanisms supported thereon may be raised or lowered about the pin 18 in response to actuation of the motor 25. The insole I is supported above the forward housing 14 and means are provided for turning the insole I while the rib R is being attached thereto to cause the periphery of the insole to be maintained in tangential paralleling relationship (later described) to the direction of feed of the insole I and rib R.

Figures 2, 3, 4, 5:
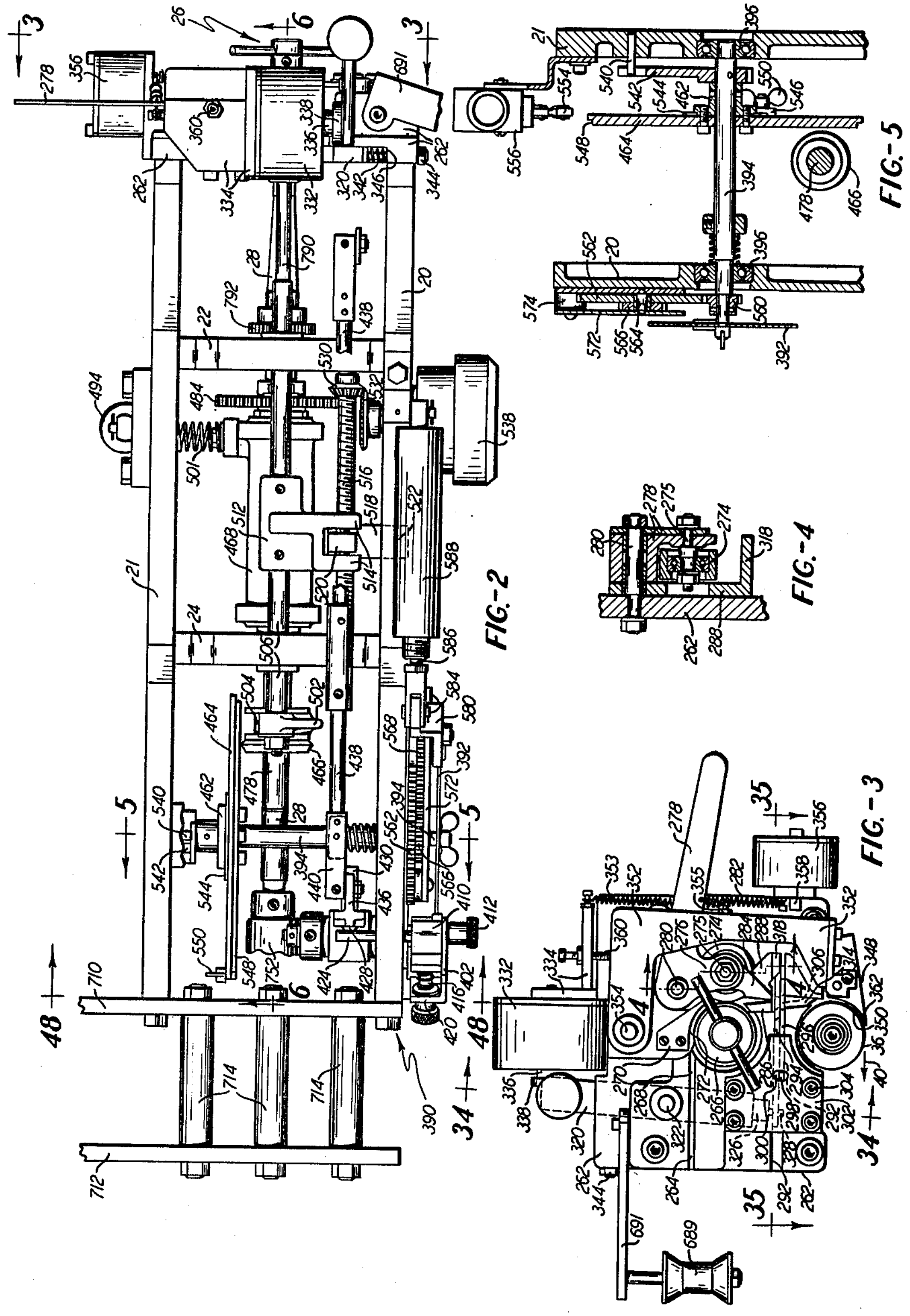
FIGURE 2 is a plan view of the head of the machine.
FIGURE 3 is a front elevation of the rib feeding unit.
FIGURE 4 is a sectional view of a portion of the rib feeding unit as seen along the line 4—4 of FIGURE 3.
FIGURE 5 is a sectional view of the head taken along the line 5—5 of FIGURE 2 and illustrating the timing disc and its associated mechanisms.
Figures 6, 7, 8, 9:
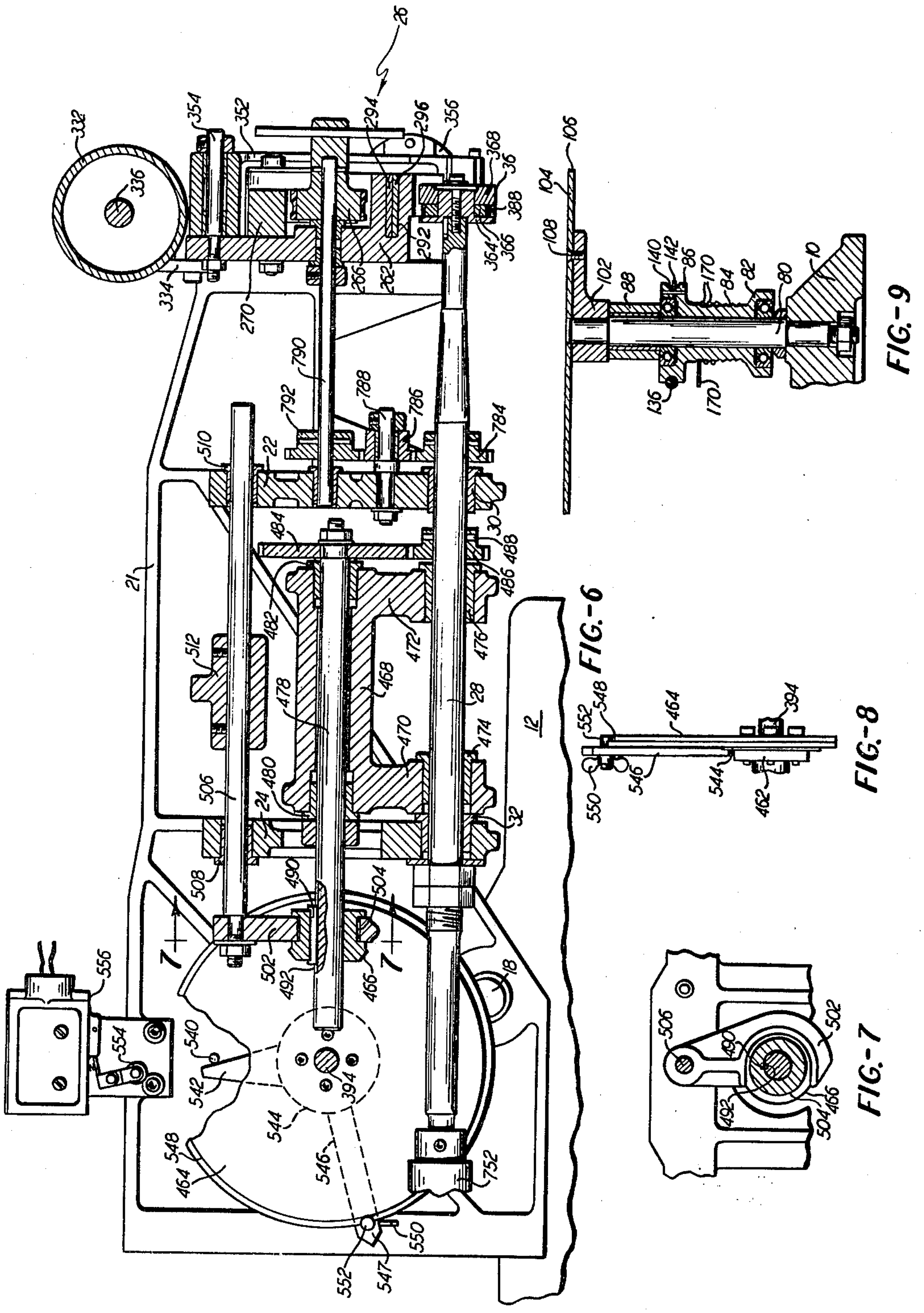
FIGURE 6 is a sectional view through the head as viewed along the line 6—6 of FIGURE 2.
FIGURE 7 is an end view partially in section of the friction wheel and yoke therefor as viewed from the line 7—7 of FIGURE 6.
FIGURE 8 is an end view of a portion of the timing disc as viewed from the rear of the machine.
FIGURE 9 is a sectional view of the post and inner cam plate taken along the line 9—9 of FIGURE 14.

Referring to FIGURES 1, 2 and 6 a main drive shaft 28 is contained within the head 16 and extends lengthwise thereof. The drive shaft 28 is journalled at the bearings 30 and 32 which are in turn supported in the bulkheads 22 and 24. The rearward end of the drive shaft 28 is connected to a transmission 34 (see FIGURE 10) that is mounted to the rearward end of the head 16, the transmission 34 in turn being driven in a manner later described. A drive roll 36 is secured to the forwardly extending end of the drive shaft 28 so as to be disposed below and in operative relation to the rib feeding unit 26. As may be seen from FIGURES 1, 14 and 15 an idler roll 38 is rotatably supported in the machine and is disposed below the drive roll 36. The insole I is intended to be supported on the idler roll 38 and the rib-feeding unit 26 is adapted to guide the rib R into position between the drive roll 36 and the idler roll 38 so that the insole I and rib R may be sandwiched therebetween. In this manner, upon rotation of the drive shaft 28, the drive roll 36 may simultaneously press the insole I and rib R together (see FIGURE 33) while feeding the rib and insole substantially in a direction indicated by the arrow 40 in FIGURES 3 and 14. The location in the machine at which the rib and insole are pressed together by the drive and idler rolls 36 and 38 will be referred to hereinafter as the line of attachment indicated in FIGURE 14 by the reference character 42. The drive and idler rolls 36 and 38 are in vertical alignment with and determine the location of the line of attachment 42. The direction of feed 40 is substantially perpendicular to the line of attachment 42.

The insole rib that is utilized in the machine is precoated with a thermoplastic adhesive and means are provided in the rib feeding unit 26 to heat and activate the adhesive just prior to the pressing of the rib R and insole I between the drive and idler rolls 36 and 38 to effect a bond therebetween.

Referring to FIGURES 1, 14, 15 and 16 a roller edge gage 44 is supported in the machine rearwardly of the drive roll 36 and idler roll 38 and at an elevation such that when the insole I is being fed past the line of attachment 42 the edge gage 44 may engage the periphery of the insole I. The edge gage 44 is movable in a substantially forward-rearward direction and by engaging the periphery of the insole aids in determining the marginal distance that the rib R will be placed from the periphery of the insole I. It may also be noted that the axis of rotation of the edge gage 44 is spaced laterally of the line of attachment 42 so that the edge gage 44 may engage a particular point on the periphery of the insole before that point has reached the line of attachment 42 for a purpose later described.

The mounting of the edge gage 44 includes a pair of brackets 46 and 48 that are pivotally mounted to the frame 10 by means of a rod 50 that extends through a boss 52 formed in the frame 10, the brackets 46 and 48 being pivotally secured to the laterally extending ends of the rod 50. Each of the brackets 46 and 48 extends upwardly and rearwardly from the rod 50 and has bosses 54 and 56 formed respectively thereon. Another rod 58 extends through the bosses 54 and 56 and is secured thereto so as to rigidify each of the brackets 46, 48 with respect to each other and enable them to swing in unison about the rod 50. A finger 60 extends upwardly from the boss 54 of the bracket 46 and supports a hinge having a vertically extending hinge pin 62. Fastened to the lower end of the hinge pin 62 is one end of a laterally extending bar 64 to which the edge gage 44 is rotatably mounted by means of a pin 66. The other end of the bar 64 is in engagement with thruster control unit 68 the purpose and function of which is described below, it being sufficient to note at present that movement of the other end of the bar 64 with respect to the bracket 48 is substantially precluded thus enabling the edge gage 44 to move in unison with the brackets 46 and 48 about the rod 50. Inasmuch as the edge gage 44 is disposed vertically above the rod 50, the movement of the edge gage 44 will be in a substantially forward-rearward direction. The aforementioned forward-rearward urging of the edge gage 44 is effected by means of an air operated motor 70 that is pivotally connected at one end thereof to the frame 10 by means of a pin 72 and which has a piston rod 74 extending from the other end thereof and which is pivotally connected to the rod 58 by means of a block 76 wherefrom it may be seen that actuation of the motor 70 may cause the brackets 46, 48 to swing about the rod 50 thereby causing the aforementioned forward-rearward urging of the edge gage 44.

It may be appreciated that inasmuch as the direction of feed 40 is lateral and in a substantially linear direction, except as will be later described, the tendency will be to feed the insole substantially linearly. In order to attach the rib R to the insole I such that the margin M (FIGURE 56) between the rib R and the periphery of the insole I may be properly controlled, it is necessary that the insole be oriented in a position such that when a particular point on the insole is located at the line of attachment 42 the tangent to the periphery of the insole at that particular point is parallel to the direction of feed 40. An insole turning unit 78 (see FIGURES 14, 15, 17, 19, 20 and 22) is incorporated into the machine for the purpose of turning the insole I during the feeding thereof past the point of attachment.

In referring to the various curved segments of the insole I an orientation of the insole I with respect to the edge gage 44 that would tend to cause an increase in the marginal distance between the rib R and the insole I as they are attached at the line of attachment 42 will hereinafter be referred to as a convex orientation (see insole I'' of FIGURE 25) and an orientation of the insole I that would tend to cause a decrease in the marginal distance as the insole and rib are continuously fed will hereinafter be referred to as a concave orientation (see insole I' of FIGURE 25). The generally desirable condition wherein continued feeding of the insole I and rib R would neither tend to increase or decrease the marginal distance M but would tend to maintain a constant margin M will be referred to as "paralleling orientation."

Figures 14, 15:
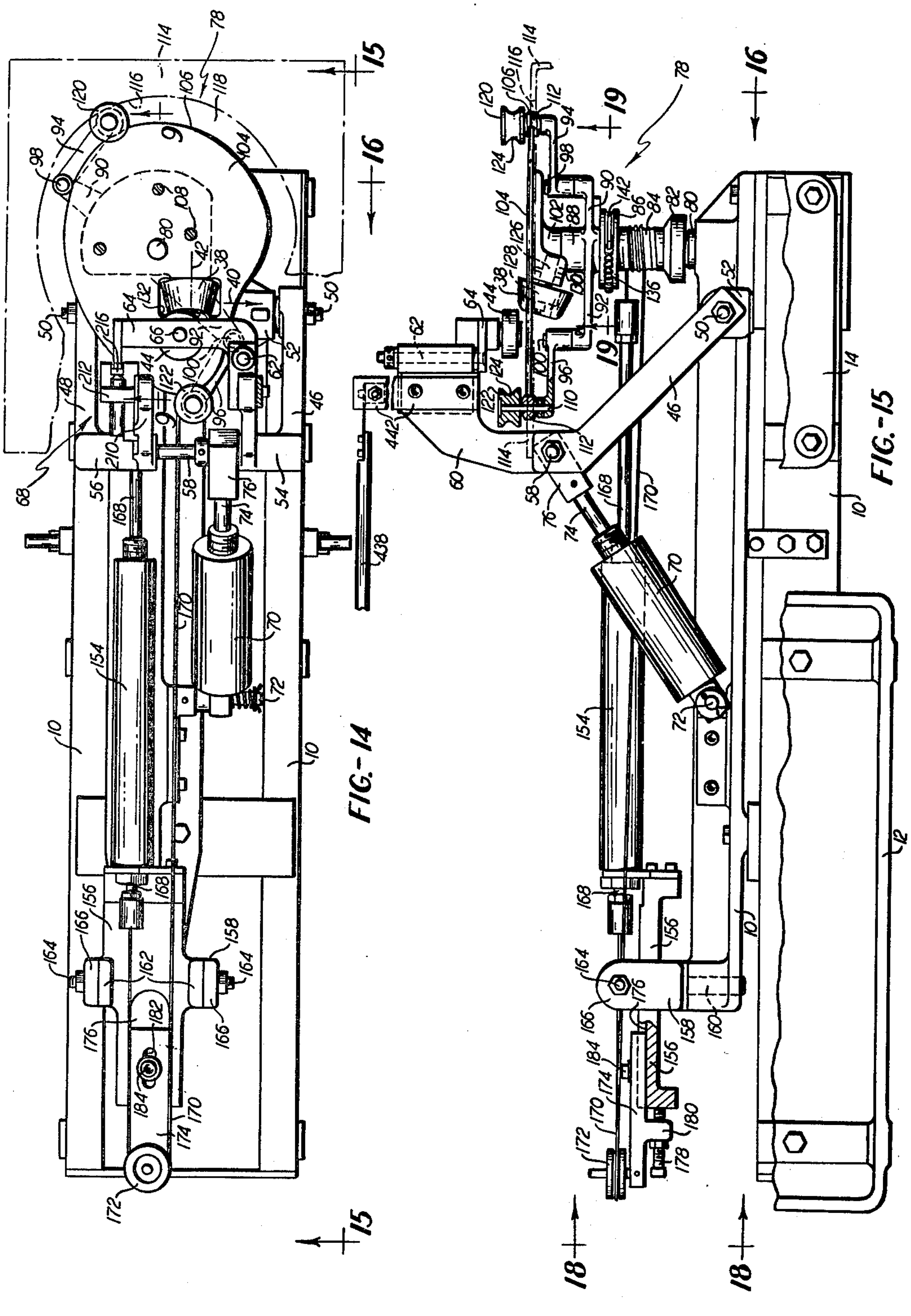
FIGURE 14 is a plan view of the machine with the head removed and illustrating the insole turning unit and thruster control unit.
FIGURE 15 is a side elevation of the insole turning unit as viewed along the line 15—15 of FIGURE 14.
Figure 16:
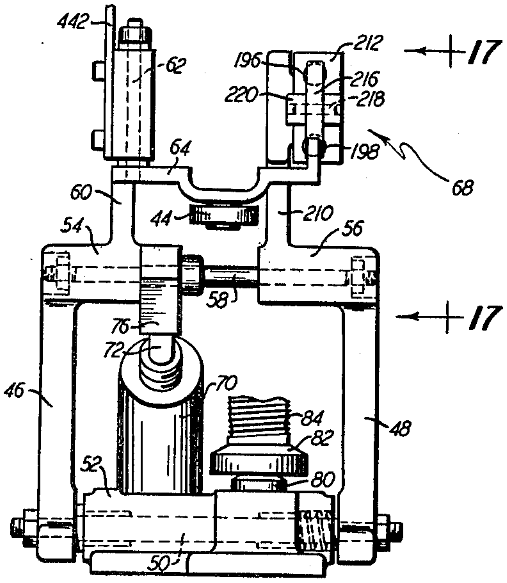
FIGURE 16 is a front elevation of the mounting for the thruster control unit and edge gage as viewed from the line 16—16 of FIGURE 15.
Figure 17:
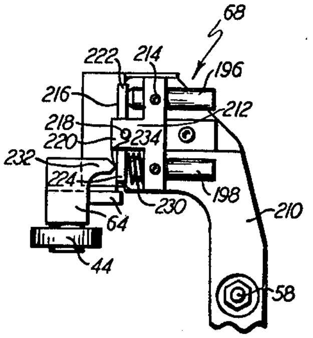
FIGURE 17 is a side elevation of the edge gage and FIGURE 16.

For the purpose of describing the operation of the insole turning unit 78 the brackets 46, 48 will be considered as being fixed in a predetermined position such that the edge gage 44 may pivot about the hinge pin 62 and that the marginal distance M between the periphery of the insole and the point of attachment will tend to remain constant as the rib is pressed to the insole. Referring also to FIGURE 9, it may be seen that a post 80 is secured to the forward end of the frame 10 and extends upwardly therefrom through the forward housing 14. A spool 82 having a continuous helical groove 84 formed thereon is rotatably supported on the post 80. The upper end of the spool 82 is formed into a flange 86. A hub 88 is rotatably mounted on the post 80 and rests on the upper surface of the flange 86, their being a pair of arms 90 and 92 extending radially from the hub 88. A pair of links 94 and 96 are pivotally mounted to the outer ends of the arms 90 and 92 by means of the pins 98 and 100 respectively. A cap 102 is rigidly mounted to the top of the post 80 and an inner cam plate 104, the edge 106 of which is formed in a predetermined contour later described, is mounted atop the cap 102 by means of screws 108. A spindle 110 is secured to the outward ends of each of the links 94, 96, and extends upwardly therefrom above the level of the inner cam plate 104. Rotatably mounted to each of the spindles 110 is a follower 112 that is at the same level as the edge 106 of the cam plate 104. Referring also to FIGURE 14 it may be seen that the links 94 and 96 extend in a clockwise direction from their respective pins 98 and 100 and with respect to the post 80.

An outer cam plate 114 is mounted atop the forward housing 14 and has an inner edge 116 that parallels the contour of the edge 106 of the inner table 104 thus defining a guideway 118 for the followers 112 therebetween. The outer cam plate 114 is at a slightly lower level in the machine than that of the inner cam plate 104 to insure that as the insole is moved over the cam plates 104 and 114 it may not be inadvertently caught within the guideway 118. A pair of thrusters 120 and 122 are rotatably mounted to the upper ends of the spindles 110 and at a level that is above that of the inner cam plate 104. Each of the thrusters 120, 122 has a groove 124 formed along the periphery thereof.

The idler roll 38 is frusto-conically shaped and is rotatably mounted by means of a pin 126 and a roller bearing 128 to a boss 130 that is formed integrally with the cap 102. A slot 132 is formed in the inner cam plate to enable a portion of the idler roll 38 to extend upwardly therethrough. It may be noted that the pin 126 and hence the axis of rotation of the idler roll 38 is inclined rearwardly and upwardly so that the uppermost portion of the idler roll 38 will lie in a horizontal plane and will extend along and define the line of attachment 42. It may also be noted here that the peripheral surface of the edge gage 44 extends downwardly to a level that is slightly below the level of the uppermost portion of the idler roll 38 so as to insure that when the insole I is resting on the idler roll 38 the edge gage 44 may engage the periphery of the insole I.

Figure 19:
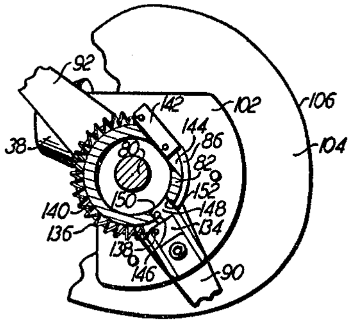
FIGURE 19 is a view of the underside of the inner cam plate and illustrating the mounting of the thrusters.
Figure 20:
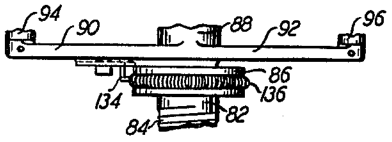
FIGURE 20 is a side elevation of a portion of the spool and supporting mechanism for the thrusters.

Means are provided for effecting rotation of the spool 82, which rotation is transmitted to the hub 88 by the below described connections which in turn cause the arms 90, 92 and links 94, 96 to rotate about the post 80, the path of movement of the thrusters 120 and 122 being determined by engagement of the followers 112 with the guideway 118. Referring to FIGURE 19, the means connecting the spool 82 and the hub 88 includes a clip 134 that is secured to the underside of the arm 90 and to which a tension spring 136 is connected a pin 138. The tension spring 136 is wrapped around the flange 86, there being a groove 140 formed about the periphery of the flange 86, the groove 140 serving to retain the spring 136 in position about the flange 86. The other end of the spring 136 is connected to the flange 86 by means of a bracket 142 which is contained within a horizontal slot 144 formed in the flange 86, the bracket 142 being secured to the flange 86. It may thus be seen from FIGURE 19 that if the spool 82 is maintained in a stationary position the tension of the spring 136 will cause the hub 88 and arms 90, 92 to be biased about the post 80 in a clockwise direction (biasing the thrusters 120, 122 counterclockwise as seen in FIGURE 14). The extent of such relative rotary movement between the spool 82 and hub 88 is limited by means of a pin 146 that is secured to the arm 90 and extends downwardly therefrom into a radially formed slot 148 formed in the flange 86. Normally the relative position of the hub 88 and spool 82 is that illustrated in FIGURE 19 with the pin 146 in engagement with the surface 150 of the slot 148 wherefrom it may be seen that when rotation of the arms 90, 92 is precluded the spool 82 may continue to rotate until the surface 152 of the slot 148 engages the pin 146, the tensile force of the spring 136 being overcome. Thus a limited amount of rotary lost motion between the hub 88 and spool 82 is permitted for a purpose later described.

The contour of the cam plates 104, 114 and the guideway 118 defined therebetween is such that as the insole I is continually fed past the line of attachment 42 some portion of the insole I will be disposed above the guideway 118 so that when the spool 82 is rotated to cause the thrusters 120 and 122 to turn about the post 80 along the path determined by the guideway 118 at least one of the thrusters 120, 122 may, if desired, be caused to engage the periphery of the insole I. By way of example and referring to FIGURES 15 and 25, if the spool 82 is caused to be rotated to effect a counterclockwise rotation of the thrusters 120 and 122, the thruster 120 will be urged into engagement with the periphery of the insole I and tend to cause counterclockwise rotation of the insole I. Conversely if the thrusters are caused to swing in a clockwise direction the thruster 122 will engage the periphery of the insole and tend to effect rotation of the insole in a clockwise direction therewith. It should be noted here, however, that although the thrusters 120, 122 could be used to effect clockwise rotation of the insole I, other means, described below, are utilized in the illustrative embodiment of the invention to effect clockwise rotation of the insole, the thrusters being used primarily for turning the insole in a counterclockwise direction.

Figure 27:
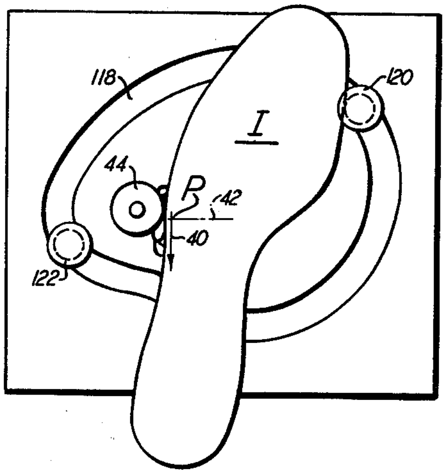
Figures 28, 29:
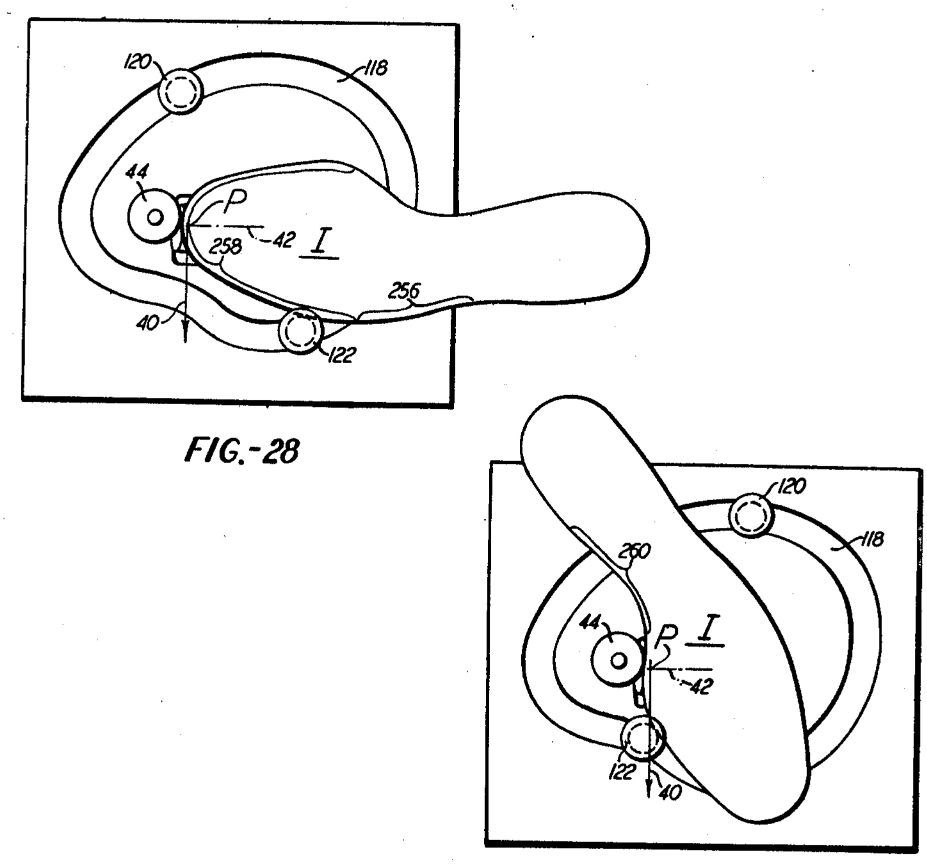

It may be appreciated that when, the tangent to the periphery of that portion of the insole 1 that it disposed at the line of attachment 42 is parallel to the direction of feed 40, there is no need to rotate the insole I in order to maintain a constant margin M. When, however, the continued feeding of the insole I causes a concave orientation thereof (as illustrated in FIGURES 27, 28) it is necessary to rotate the insole counterclockwise to return the insole to a paralleling orientation with respect to the direction of feed 40. Means, described below, are provided for sensing the concave orientation of the insole I and for effecting in response thereto rotation of the spool 82 and hence the thrusters 120, 122 in a counterclockwise direction to rotate the insole I to its parallel orientation. This sensing mechanism is also effective to sense a convex orientation of the insole and to cause the thrusters to be rotated clockwise so that they may not interfere with the clockwise rotation of the insole as it is caused to be rotated in the manner later described.

Figure 18:
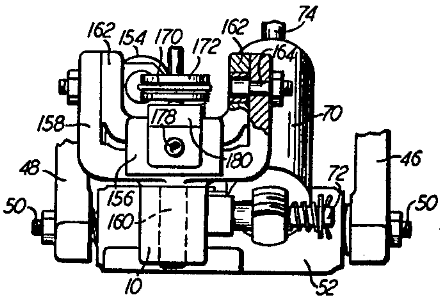
FIGURE 18 is a partly broken away view of the cable tensioning adjustment as viewed from the line 18—18 of FIGURE 15.
Figures 22, 23, 24:
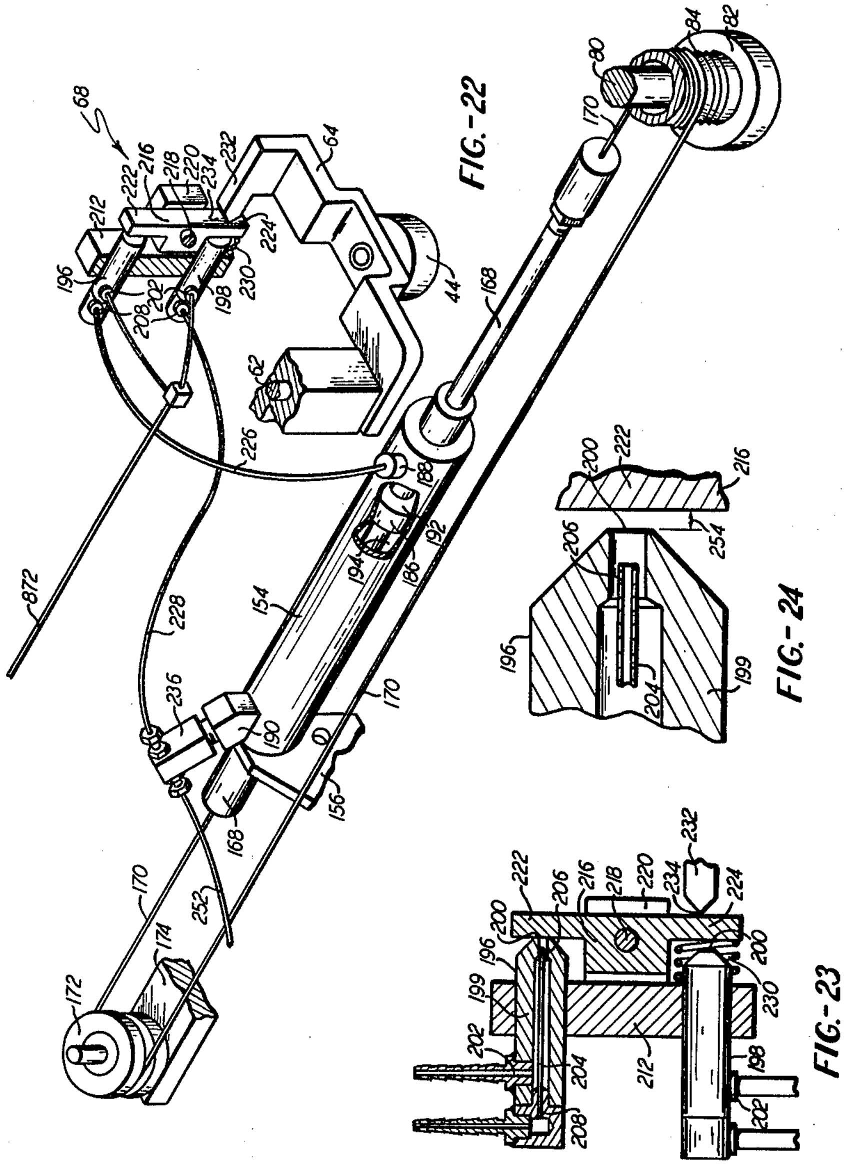
FIGURE 22 is a partially schematic illustration of the thruster control unit and the thruster drive means.
FIGURE 23 is an enlarged side elevation partially in section of the thruster control unit.
FIGURE 24 is an enlarged sectional view of one of the valves of the thruster control unit.

Referring to FIGURES 14, 15 and 22, the means for driving the spool 82 in either direction of rotation includes a double acting air operated motor 154 which is secured to the forward end of a table 156. The table 156 is mounted to the rearward end of the frame 10 for tilting movement about a lateral axis and for swinging movement in a horizontal plane by means of a yoke 158 that is pivotally mounted to and extends upwardly of the rearward end of the frame 10 at a vertical pin 160 (see also FIGURE 18). The table 156 has a pair of upstanding ears 162 which are pivotally connected at pins 164 to corresponding upstanding members 166 of the yoke 158. The motor 154 has a piston rod 168 extending out of both ends thereof. The forwardly extending end of the piston rod 168 is connected to a cable 170 which is wrapped about the grooves 84 formed in the spool 82 wherefrom the cable 170 extends rearwardly where it is wrapped about a pulley 172 and is then connected to the other, rearwardly extending, end of the piston rod 168. The pulley 172 is supported by the table 156 aand is adjustable with respect thereto in a forward-rearward direction so as to enable the tension in the cable to be properly adjusted. The mounting for the pulley 172 includes a slide 174 that is slidable in forwardly and rearwardly extending guideways 176 formed on the table 156. An adjusting screw 178 is threaded into a depending lug 180 on the slide 174 and extends forwardly therefrom so as to be abuttingly engageable with the rearward end of the table 156 so that rotation of the screw 178 may effect forward and rearward adjustment of the slide 174 and the pulley 172 mounted thereon. A slot 82 is formed in the slide 174 and a locking screw 184 extends through the slot 182 and is screwed into the table 156 to lock the slide 174 in position once it has been properly adjusted. The internal construction of the air operated motor is illustrated in FIGURE 22 wherefrom it may be seen that the piston 186 of the motor 154 is rigidly secured to the midportion of piston rod 168. The motor 154 is provided with a forward port 188 and a rearward port 190 to respectively communicate air to motor chambers 192 and 194 which are separated by the piston 186. It is evident that if the pressure in the chamber 192 is greater than that of the chamber 194 the piston rod 168 will tend to move rearwardly thereby causing the spool 82 and hence the thrusters 120, 122 to rotate in a counterclockwise direction as seen in FIGURE 14. Conversely if the pressure in the chamber 194 is greater than that of the chamber 192 the piston rod 168 will be urged forwardly thereby causing the thrusters to rotate in a clockwise as seen in FIGURE 14. The thruster control unit 68 is incorporated into the control circuit of the machine such that the differential pressures that are applied to the chambers 192 and 194 of the motor 154 may effect rotation of the thrusters in the desired direction.

Referring to FIGURES 14, 17, 22 and 23 it may be seen that the thruster control unit 68 includes a pair of valves 196 and 198 which are operative to control the flow of air to the chambers 192 and 194 of the motor 154. The valves 196 and 198 are of identical construction, each one having a hollow, cylindrical body 199 with an outlet orifice 200 formed at one end thereof. An inlet port 202 is formed within the body of each of the valves 196, 198 and serves to communicate air from a source to the hollow interior of each valve 196, 198 such that the air introduced to the inlet ports 202 of the valves 196, 198 may tend to flow towards and out of the orifices 200. Each of the valves also includes a feedback tube 204 having an inlet end 206 and an outlet 208. Each feedback tube is disposed lengthwise of and concentrically within the interior of its associated valve body 199 such that the inlet end 206 of each tube 204 is located inwardly of the outlet orifice 200. From the foregoing it may be seen that when air under pressure is introduced to the interior of the valves 196, 198 through the inlet ports 202 the air will tend to flow through the interior of the valves and out of the outlet orifices 200. As this pressurized air passes over the inlet 206 of each feedback tube, the tendency will be to create a slight negative pressure within the tube 204. It may also be appreciated that when the outlet orifice 200 of each valve is obstructed the flow of air through the outlet orifice is diminished with some of the air being directed into the inlet 206 of the feedback tube 204 thereby causing an increase in the pressure of the air contained within the tube 204 and causing air to be discharged from the outlet 208 of each feedback tube 204. The magnitude of the pressure within the feedback tube 204 thus increases or decreases as the obstruction to flow of air from the outlet orifice 200 increases or decreases. Thus if the outlet orifice 200 of the valve 196 is completely closed as shown in FIGURE 23, all of the air introduced through the inlet port 202 of the valve 196 will flow through the tube 204 and the pressure within the tube 204 will be equal to that within the inlet 202.

Referring to FIGURES 14, 16, 17 and 22, a finger 210 is formed integrally with and extends upwardly from the boss 56 of the bracket 48. A valve mount 212 is secured to the upper end of the finger 210 and the valves 196 and 198 are secured to the valve mount 212 by means of the set screws 214 and are so positioned on the valve mount 212 that their outlet orifices 200 extend forwardly, with the valves 196 and 198 being in substantially vertical alignment with each other. A heightwise extending pivot bar 216 is pivotally mounted by means of a pin 218 between and to a pair of forwardly extending nubs 220 formed integrally with the valve mount 212. The pivot bar 216 has an upper end 222 which is intended to effect obstruction of the outlet orifice 200 of the valve 196 and a lower end 224 which is intended to effect obstruction of the outlet orifice 200 of the lower valve 198. Referring to FIGURES 22 and 23, it may be seen that as the pivot bar 216 pivots on the pin 218 the obstruction presented by the pivot bar 216 to one of the orifices 200 will be increased while the obstruction presented to the flow of the air to the other of the orifices 200 will become decreased. The feed back outlet 208 of the upper valve 196 is connected by means of a line 226 to the forward chamber 192 of the motor 154 and the feed back outlet 208 of the lower valve 198 is connected by means of a line 228 to the rearward chamber 194 of the motor 154. Thus when the pivot bar 216 is pivoted in a direction tending to obstruct the orifice 200 of the upper valve 196 and open the orifice 200 of the lower valve 198 the increased pressure in the feed back tube 204 of the upper valve 196 will be transmitted through the line 226 to the forward chamber 192 of the motor 154 thereby urging the piston rod 168 rearwardly and effecting a counterclockwise rotation of the thrusters 120, 122. Conversely when the pivot bar 216 is pivoted so as to effect obstruction of the orifice 200 of the lower valve 198 and open the orifice 200 of the upper valve 196 (clockwise as seen in FIGURE 23) the increase in pressure within the feed back outlet 208 of the lower valve 198 will be transmitted to the rearward chamber 194 of the motor 154 thus establishing a pressure differential between the chambers 192 and 194 and urging the piston rod 168 forwardly so as to effect a clockwise rotation of the thrusters 120, 122. It should also be appreciated that the pivot bar 216 may be in an intermediate position wherein the pressure at the feed back outlets 208 of both valves 196, 198 are equal. When this is the case the pressure in the forward chamber 192 and rearward chamber 194 of the motor 154 will be equal so that the piston rod 168 may be maintained in a stationary position thus maintaining the thrusters 120 and 122 in a stationary position. Referring to FIGURES 22 and 23, the pivot bar 216 is biased by means of a compression spring 230 that encircles the forwardly extending end of the lower valve 198 and is compressed between the valve mount 212 and the lower end 224 of the pivot bar 216 so as to tend to urge the pivot bar 216 to a position wherein the outlet orifice 200 of the upper valve 196 is fully obstructed and wherein the outlet orifice 200 of the lower valve 198 is substantially unobstructed.

Supported at the unhinged, free end of the laterally extending bar 64 is a rearwardly extending finger 232 having a knife edge 234 formed thereon and being disposed such that the knife edge 234 may engage the lower end 224 of the pivot bar 216. It may thus be seen that a rearwardly directed force applied to the edge gage 44 will tend to cause the bar 64 and the rearwardly extending finger 232 to pivot rearwardly about the pin 62. Rearward movement of the knife edge 234 causes the pivot bar 216 to pivot about the pin 218, compressing the spring 230, and tending to increase the obstruction presented to the lower valve 198 and decrease the obstruction presented to the upper valve 196, the effect of which being to actuate the motor 154 to rotate the spool 82 and hence the thrusters 120, 122 in a clockwise direction. When this rearwardly directed force on the edge gage 44 is relieved the compression spring 230 may expand to pivot the pivot bar 216 in the opposite direction thus effecting a counterclockwise rotation of the thrusters 120 and 122.

When the machine is in an idle position and awaiting the presentation of an insole thereto the piston rod 168 of the motor 154 is maintained in its forwardmost position, with the piston 186 bottoming out against the forward end of the motor 154 so that the thrusters 120 and 122 may be rotated to their most clockwise position for reasons later described. For this purpose a gravity biased shuttle valve 236 (see also FIGURE 32) is interposed between the line 228 and the rearward chamber 194 of the motor 154. The shuttle valve 236 has an outlet port 238 which is in direct communication with the rearward chamber 194 of the motor 154 and a pair of axially aligned passageways 240 and 242 that are in communication with the outlet port 238. A shuttle 244 is slidably contained within the passageways 240 and 242 and has an enlarged mid-portion 246 that is adapted to alternatively engage either of the shoulders 248 and 250 formed within the passageways 240 and 242 respectively, so that when the mid-portion 246 of the shuttle 244 is in engagement with the shoulder 250 only communication between the outlet port 238 and passageway 240 is permitted. Conversely when the mid-portion 246 of the shuttle 244 is in engagement with the shoulder 248 communication only between the passageway 242 and the outlet port 238 is permitted. The control circuit of the machine is effective, while the machine is idle, to preclude flow of air from the source to the inlet ports 202 of the valves 196 and 198 thus precluding any flow of air from the valves 196 and 198 to the motor 154. The control circuit is also effective during this time to permit air under high pressure to flow through a line 252 which is in communication with the passageway 242 of the shuttle valve 236 thus urging the shuttle 244 to a position wherein the mid-portion 246 is in engagement with the shoulder 248 to permit flow of air through the passageway 242, the outlet port 238 of the shuttle valve 236 and into the rearward chamber 194 of the motor 154 thereby maintaining the piston rod 168 of the motor 154 in its forwardmost position. When the cycle of operation of the machine is initiated by the operator, the control circuit causes the pressure in the line 252 to be relieved thereby terminating the flow of high pressure air into the rearward chamber 194 of the motor 154. The valve 236 is mounted in such a manner that the common axis of the passageways 240 and 242 is inclined to the horizontal. This mounting of the shuttle valve 236 enables the shuttle 244 to slide downwardly under its own weight once the pressure in the line 252 has been relieved. The shuttle 244 slides down in this manner until the enlarged mid-portion 246 engages the shoulder 250 thus effecting communication between the passageway 240 and the outlet port 238 of the shuttle valve 236, so that as the cycle of operation begins the rearward chamber 194 of the motor 154 may be in communication with the thruster control unit 68.

Figure 25:
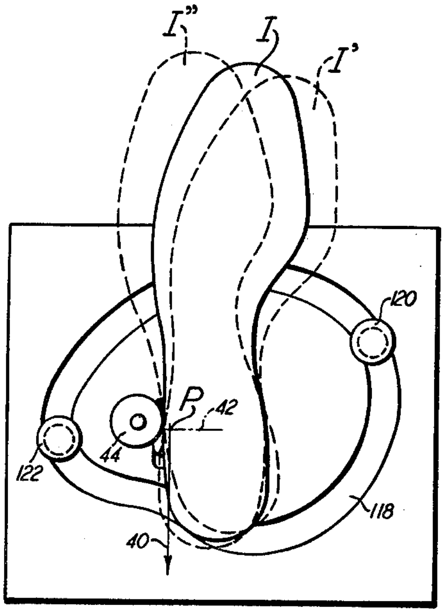
FIGURES 25 through 30 illustrate the various positions of a right insole as it is progressively fed and guided past the line of attachment.

When the machine is in an idle position and is awaiting the presentation of an insole thereto the head 16 is in its upward position with the drive roll 36 spaced heightwise of the idler roll 38 to enable the insole I to be inserted therebetween in the position illustrated in solid in FIGURE 25. As may be seen from FIGURE 25 the insole I should be inserted in such a manner that the line of attachment 42 coincides with the point on the insole where the rib R is to begin. It is desirable to present the insole to the machine in paralleling orientation and in contact with the edge gage 44. As the cycle of operation of the machine is initiated the head 16 is moved downwardly, the drive roll 36 moving downwardly therewith towards the idler roll 38 to grip the insole therebetween. As mentioned earlier just before the beginning of cycle of operation of the machine there is no rearwardly directed pressure on the edge gage 44 so that the spring 230 may cause the pivot bar 216 to fully block the outlet orifice 200 of the valve 196. It may thus be seen that, when the machine cycle is begun and the shuttle valve 236 is shifted to permit the flow of air from the valves 196, 198 to the motor 154, air will be directed through the valve 196 and into the forward chamber 192 of the motor 154 thus tending to rotate the thrusters 120, 122 in a counterclockwise direction. As may be seen from FIGURE 25, the thrusters 120, 122 when in their most clockwise position are so spaced that they may not interfere with the presentation of the insole I to the machine. After the insole has been placed in the machine and the machine operation is begun, the initial tendency of the thrusters to rotate counterclockwise will cause one of the thrusters (e.g. the thruster 120 in FIGURE 25) to engage the insole and urge it counterclockwise therewith. As the thrusters engage the insole the spring 136 serves to reduce the shock of engagement therebetween. As will be described later in detail, rotation of the insole takes place about a pivot point P (see FIGURE 55), it being sufficient to note here that the pivot point P is on the line of attachment 42 so that the edge gage 44 engages a particular point of the insole before that point is fed to the pivot point P. As the insole is urged counterclockwise about the pivot point P it causes the edge gage 44 to be urged in a rearward direction thus urging the knife edge 234 rearwardly and causing the pivot bar 216 to pivot about its pin 218 in such a manner that the outlet orifice 200 of the valve 196 tends to become unblocked thereby tending to reduce the pressure in the forward chamber 192 of the motor 154 while the outlet orifice 200 of the valve 198 tends to become more restricted thereby causing an increase in the pressure in the rearward chamber 194 of the motor 154. This rearward urging of the edge gage 44 continues until the pivot bar 216 has been rotated to a position wherein the flow of air from the feedback outlets 208 of each of the valves 196 and 198 is equal thereby equalizing the pressure in the forward and rearward chambers 192 and 194 of the motor 154. This will maintain the piston rod 168 in a stationary position to terminate the rotation of the thrusters 120 and 122 and tend to maintain the thrusters in that position until a change in the periphery of the insole causes movement of the edge gage 44 which, by means of the thruster control unit 68, will cause the motor 154 to again effect a turning of the thrusters in the desired direction.

The dimensions of the valves 196, 198 and the pivot bar 216 are such that a minimal amount of movement of the pivot bar 216 is required in order to effect a substantial change of pressure in the forward and rearward chambers 192, 194 of the motor 154. For example, the gap 254 between the outlet 200 of either of the valves 196, 198 and the pivot bar 216 need only be in the order of .010″ to effect a full opening of the outlet orifice 200. The levered mounting of the edge gage 44 enables a relatively small movement of the edge gage 44 to effect a greater movement of the knife edge 234, resulting in a system of high sensitivity.

Figure 26:
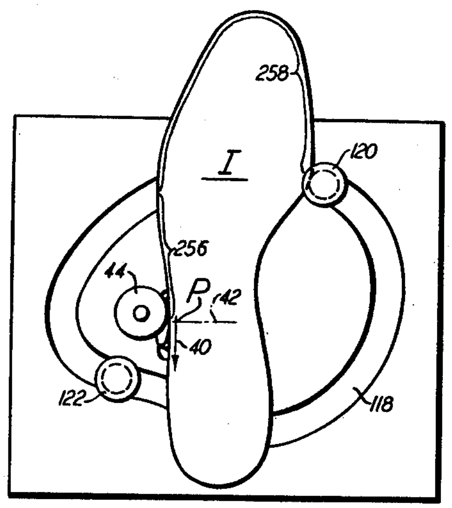

Although the drive roll 36 tends to feed the insole in a linear direction, the frusto-conical construction of the idler roll 38 and the inclination of its axis of rotation tends to impart a continuous clockwise torque to the insole about its pivot point P. When the drive roll 36 is rotated to effect feeding of the insole I along the direction of feed 40, the continued feeding of the insole will cause the portion 256 of the insole I (FIGURE 26) to be disposed in a slightly concave orientation from which it may be seen that in order to continuously maintain the periphery of the insole in paralleling orientation the insole must be rotated counterclockwise as the convex portion 256 of the insole is fed past the line of attachment 42. As the insole progresses from the position illustrated in FIGURE 25 to that illustrated in FIGURE 26 there is substantially no change in the curvature of the insole and the insole is maintained in paralleling orientation as it is fed, the tendency of the idler roll 38 to cause clockwise rotation of the insole being resisted by engagement of the insole with the thruster 120. The clockwise rotation of the insole is effected by means of engagement of the convex portion 256 of the insole with the edge gage 44 without any assistance from the thrusters 120, 122. It is important to note here that the edge gage 44 engages a particular point on the insole before that point on the insole reaches the line of attachment 42. This advanced engagement of the edge gage 44 with the insole I will enable convex oriented portions of the insole to be dragged about the edge gage 44 and to thus effect the desired clockwise rotation of the insole I. The clockwise rotational effect of the idler roll 38 aids the insole in this regard. In order to permit the insole to be rotated in a clockwise direction from the position illustrated in FIGURE 26 to the position illustrated in FIGURE 27 it is necessary to rotate the thrusters 120, 122 clockwise so that they may not interfere with and oppose the clockwise rotation of the insole I. Movement of the thrusters to a non-interfering, clockwise position is caused by the rearward urging of the edge gage 44 as it is engaged by the convex portion 256 of the insole I which tends to increase the pressure in the rearward chamber 194 of the motor 154 to rotate the thrusters clockwise. This rearward force on the edge gage 44 is aided by the fact that just before the convex portion 256 engages the edge gage 44, the thruster 120 is in contact with the insole to preclude its clockwise rotation until the edge gage 44 begins to move rearwardly at which time the clockwise movement of the thrusters 120, 122 begins and the pressure on the edge gage 44 is relieved until a point of equilibrium in the motor 154 has occurred.

The drive roll 36 continues to feed the insole until it has reached the position illustrated in FIGURE 27 wherein the insole I has been rotated to maintain the periphery thereof in parallel orientation and wherein the next portion 258 of the insole is disposed in concave orientation. As the feeding of the insole continues and as the portion 258 of the insole moves past the edge gage 44, the edge gage 44 will move forwardly under the influence of the spring 230 thereby causing the thrusters 120, 122 to rotate counterclockwise and rotate the insole counterclockwise therewith. The clockwise rotational effect of the frusto-conical idler roll 38 is considerably less than the counterclockwise rotational effect of the thrusters 120, 122 so that, as the thrusters 120, 122 are rotating the insole counter clockwise about the pivot point P, the insole will slip on the idler roll 38. This rotation of the thrusters 120, 122, and the insole I will continue until the rearward movement of the edge gage 44 has caused the pivot bar 216 to be pivoted to a position such that the chambers 192 and 194 of the motor 154 are in equilibrium and the thrusters will no longer rotate. It may be noted that the entire forepart portion 258 of the insole will tend to be disposed in a concave orientation as the insole is fed along the direction of feed 40. As the insole I is fed and rotated from the position of FIGURE 27 to that of FIGURE 28, the toe end of the insole withdraws from its overlapping position over the guideway 118. As the toe end of the insole is so withdrawn the thruster 120 which, until that time, had been urging the insole I counterclockwise, can no longer engage the insole and at this time a condition may be reached where neither of the thrusters 120, 122 is in engagement with the insole. This condition, however, is corrected almost instantaneously so that its short duration has substantially no effect on the proper feeding of the insole. Correction of this condition is caused by the fact that when neither of the thrusters is in engagement with the insole, the concave orientation of the insole as illustrated in FIGURE 27 will enable the edge gage 44 to move forward very slightly but an amount sufficient to accelerate the counterclockwise rotation of the spool 82 until the thruster 122 engages the insole and continues the counterclockwise urging thereof. The counterclockwise acceleration of the spool 82 and thrusters 120, 122 is accentuated by reason of the continuous clockwise torque that is applied to the insole by the idler roll 38, thus enabling the edge gage 44 to move forwardly more quickly.

Figure 30:
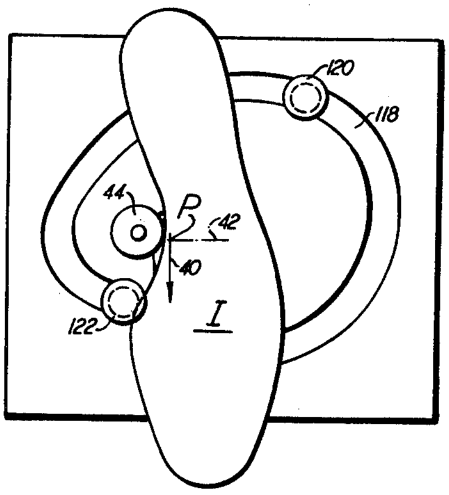

The thrusters continue to rotate counterclockwise from the position illustrated in FIGURES 27 and 28 to the position illustrated in FIGURE 29 at which time the insole becomes disposed again in a convex orientation. At this time the continued feeding of the insole causes the portion 260 of the insole to urge the edge gage 44 rearwardly and simultaneously drag about the edge gage 44 to effect a clockwise yielding of the thrusters 120, 122, thus permitting the insole I to rotate in a clockwise direction by reason of its contact with the edge gage 44. This clockwise rotation of the insole is again aided by the rotational effect of the idler roll 38. This mode of operation of effecting rotation of the insole continues through the position illustrated in FIGURE 30 until the control circuit of the machine brings the cycle of operation to an end.

Figure 54:
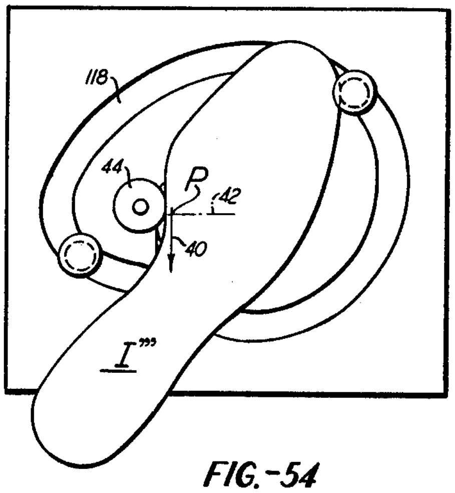
FIGURE 54 is an illustration of a left insole as its shank and ball portions are fed and guided past the line of attachment.

The continuous clockwise torque that is applied to the insole I by the frusto-conical idler roll 38 is particularly effective when the orientation of the insole I is undergoing a transition from a convex orientation where the insole is rotated clockwise to a concave orientation where the direction of rotation is reversed to counterclockwise (see FIGURES 27 and 54). While the insole is rotating in a clockwise direction the thrusters 120, 122 do not aid in this rotation but tend to rotate clockwise only so as not to interfere with the clockwise rotation of the insole I. It may sometimes occur that the force with which the insole is gripped between the drive roll 36 and idler roll 38 tends to resist the rotation of the insole I to a degree that as the insole is dragged about the edge gage 44 it may tend to urge the edge gage 44 rearwardly in excess to a position wherein the thrusters 120, 122 are rotated clockwise excessively and completely out of engagement with the insole I. It is also to be noted that as the transition from clockwise to counterclockwise rotation of the insole and thrusters occurs there will necessarily be a shift in the balance of pressure in the forward and rearward chambers 192 and 194 of the motor 154 in order to cause the thrusters 120, 122 to reverse their direction of rotation. The delays inherent in a pneumatic control circuit such as that utilized in the instant machine may be such that the reversal of the motor 154 may be delayed and the thrusters may not begin their counterclockwise rotation as soon as would be desirable. The continuous clockwise torque that is applied to the insole I by the idler roll 38 tends to accentuate the concave orientation of the insole as it is presented to the edge gage 44, the thrusters 120 and 122 having been rotated excessively in a clockwise direction and thus being unable to preclude the clockwise rotation of the insole, i.e.: as the concave orientation of the insole I just begins to occur (see FIGURES 27 and 54) the clockwise torque tends to increase the degree of concave orientation, the effect being to enable the edge gage 44 to move forwardly a greater distance than would normally be permitted were the thrusters 120, 122 in engagement with the insole. This excess forward movement of the edge gage 44 is effective to increase the reversed pressure differential in the motor 154 thus eliminating delay of the counterclockwise rotation of the thrusters and bringing the thrusters into engagement with the insole I so that they may be in readiness to effect the counterclockwise rotation of the insole.

Referring to FIGURES 1, 3 and 6 it may be seen that an end cap 262 is secured to the forward end of the head 16, the rib feeding unit 26 being supported on and about the end cap 262. The end cap 262 is essentially a casting having a guideway 264 formed therein through which a folded rib R may be passed. A feed roll 266 is rotatably mounted to the end cap 262 and is disposed in a position such that as the rib R passes from the outlet end 268 of the guideway 264 the rib may engage the upper portion of the feed roll 266 and thereafter be partially wrapped about the periphery of the feed roll 266 (see FIGURES 36 and 37). A guide member 270 having a curved surface 272 that embraces the upper portion of the feed roll 266 is secured to the end cap 262 and serves to engage and guide the rib R about the feed roll 266 as the rib R leaves the outlet end 268 of the guideway 264. A pressure roll 274 (see also FIGURE 4) is rotatably mounted by a pin 275 to a downwardly extending portion 276 of a lever 278, the lever 278 in turn being pivoted to the end cap 262 by a pin 280 in such a manner that the lever 278 may be pivoted about the pin 280 to urge the pressure roll 274 towards and away from the feed roll 266. The lever 278 is biased by means of a spring 282 in such a manner that the pressure roll 274 may urge the rib R firmly against the feed roll 266 to facilitate the gripping and feeding of the rib R by the feed roll 266 (see FIGURES 3 and 36). The feed roll 266 is disposed above the drive roll 36 in such a manner that the rib R may travel downwardly from between the point of engagement of the rib by the feed roll 266 and pressure roll 274 and be wrapped about the drive roll 36. Formed at the downwardly projecting portion 276 of the lever 278 is an extension 284 that is disposed adjacent the downward path of movement of the rib R as it travels from the feed roll 266 to the drive roll 36. This extension 284 cooperates with a lug 286 that is disposed adjacent to but on the opposite side of the path of travel of the rib R, the extension 284 and lug 286 being movable towards each other to clamp the rib therebetween (see FIGURE 37) for a purpose later described. The lug 286 is formed integrally with a bar 288 which in turn is pivotally supported and depends from the pin 280 to which the lever 278 is mounted. As may be seen from FIGURE 36, when the rib R is disposed between the feed roll 266 and the pressure roll 274 it causes the pressure roll 274 to become spaced from the feed roll 266 which in turn causes the lever 278 to pivot counterclockwise about the pivot 280, overcoming the biasing effect of the spring 282 and causing the extension 284 of the lever 278 to be spaced from the lug 286 so as not to clamp the rib R between the extension 284 and the lug 286 and enable the rib to pass downwardly therebetween. It may be noted that when a rib R is not disposed between the feed roll 266 and pressure roll 274, the extension 284 will be urged by the spring 282 towards the lug 286, this movement of the lever 278 and lug 286 being limited by means of engagement of the lug 286 with a surface 290 formed on the end cap 262.

Figures 36, 37:
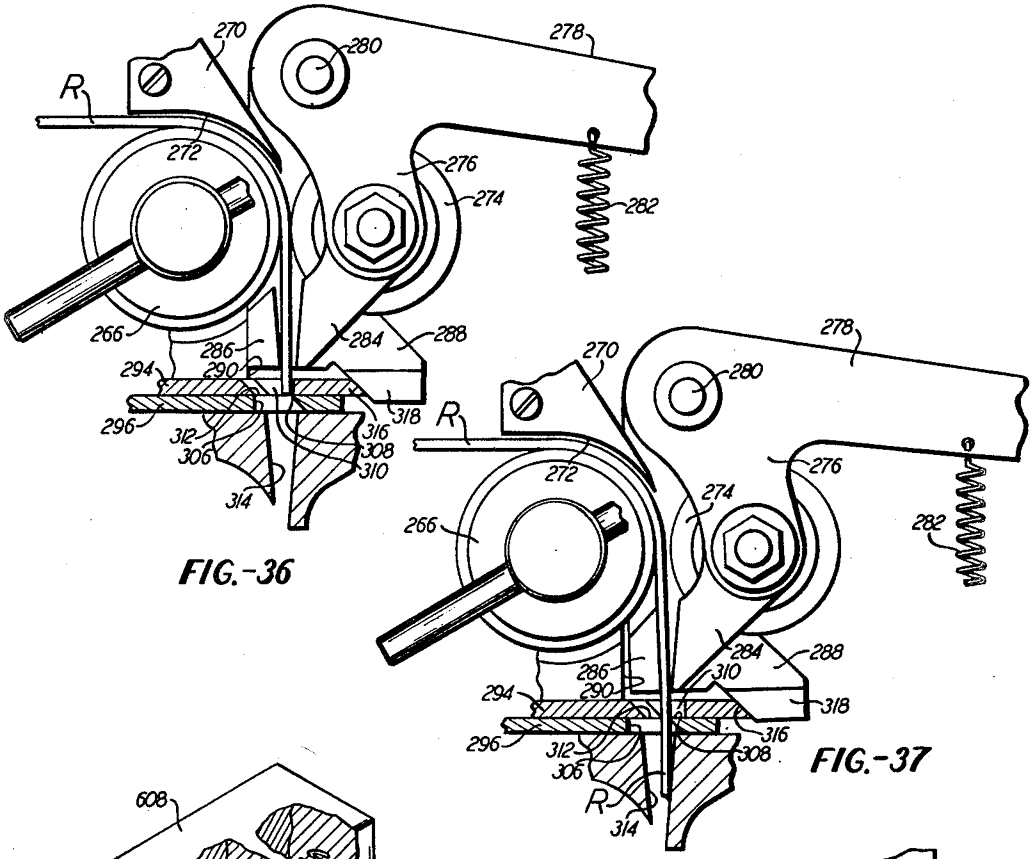
FIGURE 36 is a magnified view of the rib feeding unit and illustrating the relative position of the knives, rib clamp, and rib in an idle position.
FIGURE 37 is a view similar to FIGURE 36 illustrating the position of the knives and rib clamp during the cutting stroke.

A horizontal slot 292 is formed in the end cap 262 and serves to contain an upper knife 294 and a lower knife 296, the slot 292 and knives 294, 296 being disposed below the extension 284 and lug 286 and in intersecting relationship with the downward path of travel of the rib R as the rib travels from the feed roll 266 to the drive roll 36. The lower knife 296 is maintained in a fixed position by means of a finger 298 formed integrally with the knife that extends forwardly into a hole 300 formed within a cover plate 302 which in turn is secured to the end cap 262. The cover plate 302 is secured to the end cap 262 by means of bolts 304, the holes formed in the cover plate 302 to accommodate the bolts 304 being oversized to enable adjustment of the cover plate 302 and the lower knife 296 along the slot 292. An opening 306 is formed within the lower knife 296 and when the lower knife is properly positioned within the slot 292 the opening 306 will be disposed along the path of travel of the rib R so as to enable the rib to pass downwardly therethrough. A sharp knife edge 308 is formed at the upper end of the opening 306 of the lower knife 296. The upper knife 294, which is movably contained within the slot 292 and rests on the lower knife 296, has an opening 310 formed therein, this opening 310 having a knife edge 312 formed thereon which, when the upper knife 294 is moved to the right as seen in FIGURES 3, 36 and 37, will cooperate with the knife edge 308 of the lower knife 296 to cut the rib R. While the machine is operating to feed the rib R downwardly toward the drive roll 36 the upper knife 294 is in the position illustrated in FIGURE 36 wherein the openings 310, 306 of the upper and lower knives 294, 296 are in alignment along the path of travel of the rib R to enable the rib to pass freely therethrough and downwardly towards the drive roll 36. A tapered slot 314 is formed on the end cap 262 below the knives 294, 296 and along the path of travel of the rib R to enable the rib to pass downwardly from the knives to the drive roll 36. When, in a manner later described, the rib R is to be cut, the upper knife 294 is caused to move to the right as seen in FIGURES 3, 36 and 37 to effect a cutting stroke between the knife edges 312 and 308.

In order to insure that the rib will be cut cleanly and in precisely the location desired it is desirable to clamp the rib so as to firmly grip it during the cutting stroke. To this end it may be seen that, as the upper knife 294 is moved to the right in a cutting stroke, the tip 316 of the knife 294 will engage a lug 318 that is formed integrally with the bar 288 and extends forwardly so as to be positioned in interfering relationship with tip 316 of the upper knife 294. When the tip 316 of the upper knife 294 engages the lug 318, the bar 288 is urged counter-clockwise about the pivot 280 thereby urging the other lug 286 towards the extension 284 of the lever 278 to clamp the rib R therebetween. As may be seen from FIGURE 37, the parts are so constructed that the clamping of the rib R will be completed before or just as the cutting of the rib commences. It should also be noted that the tip 316 of the upper knife 294 is formed at an incline to its direction of movement and the engaging surface of the lug 318 is formed along the same inclined plane so that while the upper knife is moving in a cutting stroke the inclined plane of engagement of the tip 316 of the knife 294 and the lug 318 will have a wedge effect and tend to urge the upper knife 294 firmly against the lower knife 296 thus insuring proximity of the cutting edges 312 and 308 during the cutting stroke.

Figure 34:
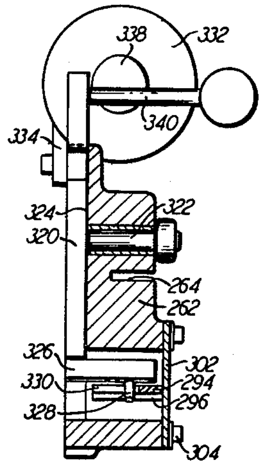
FIGURE 34 is a sectional view of the rib feeding unit taken along the line 34—34 of FIGURE 3.
Figure 35:
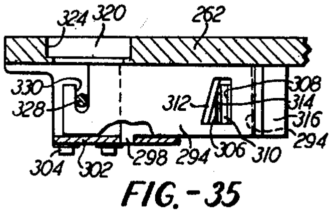
FIGURE 35 is a sectional view of the rib feeding unit illustrating the knives as viewed along the line 35—35 of FIGURE 3.

Referring to FIGURES 3, 34 and 35, the movement of the upper knife 294 is effected by means of a lever 320 that is pivotally mounted to the rearward face of the end cap 262 by means of a pin 322. A cut out 324 is formed in the rearward surface of the end cap 262 for accommodation of the lever 320. A forwardly extending bar 326 is secured to the lower end of the lever 320 and has a pin 328 that extends downwardly therefrom into a slot 330 that is formed in the upper knife 294 so that as the lever 320 is rotated counterclockwise, as seen in FIGURE 3, the upper knife 294 may move in a cutting stroke and when the lever 320 is rotated clockwise, as seen in FIGURE 3, the upper knife 294 may be retracted to the position illustrated in FIGURES 3 and 36 wherein the holes 310 and 306 of the knives 294 and 296 are in alignment to enable the rib R to pass therethrough. The drive means for effecting this movement of the lever 320 includes an air operated motor 332 that is mounted to the end cap 262 by means of a bracket 334 and has a piston rod 336 having a cap 338 threaded on the end thereof. A rod 340 is secured to and extends forwardly of the upper end of the lever 320 and is disposed in alignment with the path of movement of the cap 338 of the motor 332 so that when the motor 332 is actuated to urge the piston rod 336 to the left as seen in FIGURE 3, the cap 338 may engage the rod 340 and cause a counterclockwise swinging of the lever 320 to move the upper knife 294 in a cutting stroke. The lever 320 is biased in a clockwise direction to maintain the rod 340 in continual engagement with the cap 338 by means of a spring 342 that circumscribes a stop bolt 344 and is interposed between the lever 320 and a shoulder 346 formed on the end cap 262 (see FIGURE 2). The stop bolt 344 may be adjusted to limit the extent of counterclockwise movement of the lever 320 and hence the length of the cutting stroke of the upper knife 294.

As the rib R is fed downwardly and is wrapped about the drive roll 36 with the thermoplastic coated surface exposed on the outside of the drive roll 36, a heater 348 (FIGURE 3) having a cylindrical surface 350 formed thereon is brought to bear against the exposed thermoplastic surface of the rib R so as to activate the thermoplastic adhesive in readiness for the pressing and bonding of the rib R to the insole I. The heater 348 is supported from an arm 352 which is in turn pivotally connected at its upper end to the end cap 262 by means of the pin 354. When in an idle position the arm 352 is biased in a counterclockwise position by a spring 353 extending between the bracket 334 and a pin 355 so as to space the heater 348 from the drive roll 36 and enable the leading edge of a rib R to be initially inserted therebetween. When the cycle of operation of the machine begins, a motor 356 which is secured to the end cap 262 is actuated to cause its piston rod 358 to move to the left as seen in FIGURE 3, the piston rod 358 being engageable with the arm 352 to swing the heater 348 towards engagement with the thermoplastic coated surface of the rib R. The heating of the thermoplastic surface of the rib R causes a thin film of thermoplastic fluid to be disposed between the surface 350 and the rib, this fluid film serving as a lubricant to minimize friction therebetween. A stop bolt 360 is threaded into a portion of the bracket 334 and extends downwardly to be engageable with the upper portion of the arm 352 thus limiting the extent of counterclockwise rotation of the arm 352 caused by the spring 353 and hence the spacing between the heater 348 and the drive roll 36 when in an idle position.

Figures 31, 32, 33, 58:
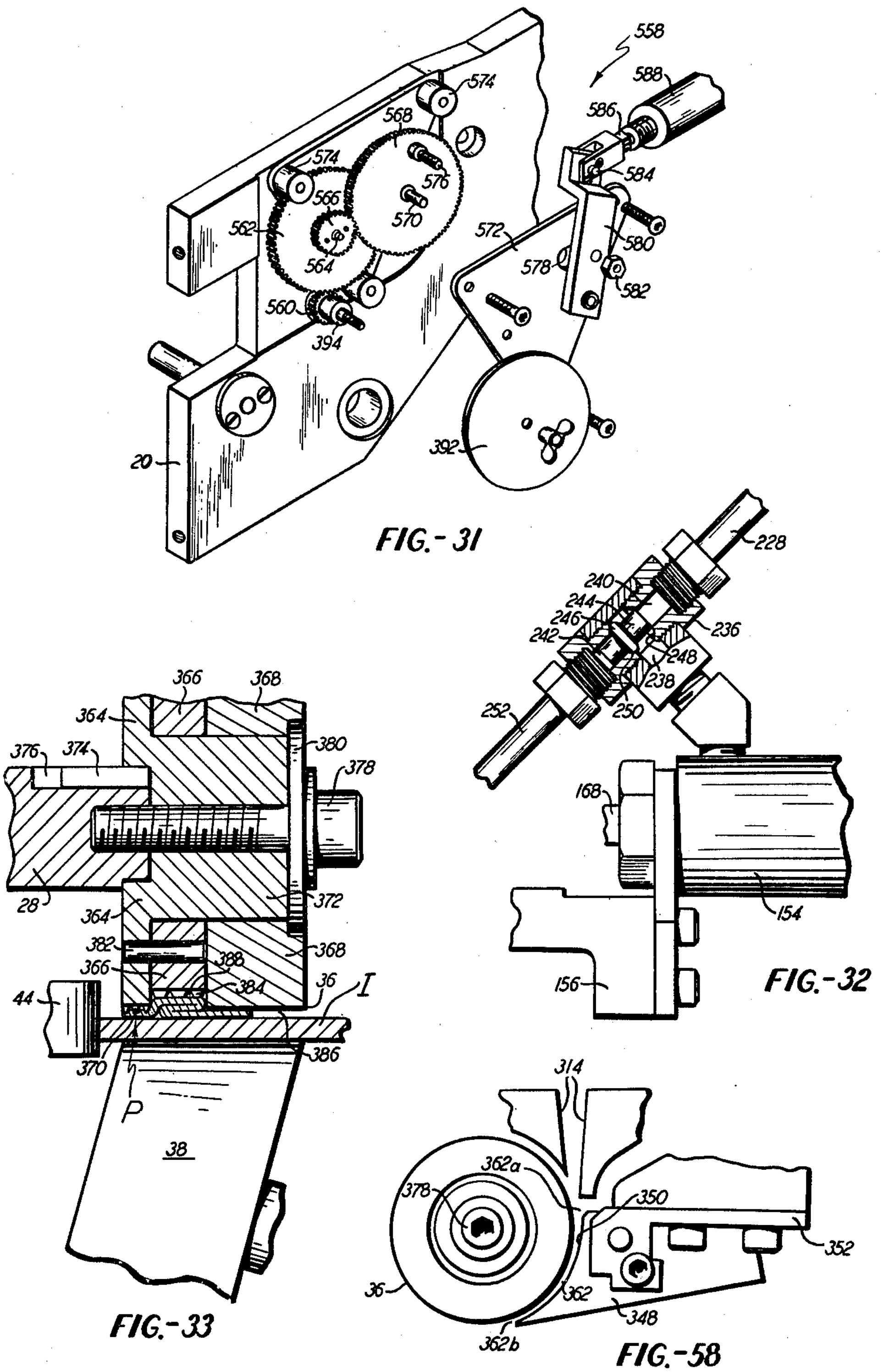
FIGURE 31 is an exploded view of the timing disc reset mechanism.
FIGURE 32 is a sectional view of the shuttle valve that is associated with the thruster drive motor.
FIGURE 33 is a sectional view of the drive roll illustrating its cooperation with the edge gage and idler roll.
FIGURE 58 is a magnified front illustration of the drive roll and heater block.

The heater 348 is supported in such a manner that when it is urged towards the drive roll 36 to engage the precoated surface of the rib R, the space 362 between the drive roll 36 and cylindrical surface 350 of the heater 348 through which the rib passes is greater at the upper, inlet end 362*a* than at the lower, exit end 362*b* (see FIGURE 58). This greater spacing at the inlet end 362*a* facilitates entrance of the leading edge of the rib R into the space 362. The narrowing of the space 362, in wedge-like manner, enables the rib to be progressively pressed more firmly between the heater 348 and drive roll 36 thus rendering the feeding of the rib R by the drive roll 36 more efficient and less susceptible to slippage.

Figure 57:
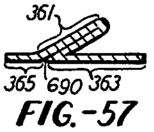
FIGURE 57 is a cross-sectional view of the rib in its final precision folded configuration.

In referring to the various portions of the rib R, and as illustrated in FIGURE 57, the rib R, when folded to its final form, includes the fold 361, the major base portion 363 and the minor base portion 365.

Referring to FIGURES 6 and 33 it may be seen that the drive roll 36 is composed of stacked discs 364, 366 and 368 each of which has a different outside diameter and surface formed about the circumference thereof. Formed about and extending radially from the periphery of the disc 364 are a plurality of relatively sharp teeth 370 that are adapted, for reasons later described, to penetrate the fabric from which the rib R is formed. A hub 372 is formed integrally with the disc 364, the discs 366 and 368 being mounted to the hub 372. The disc 364 and the hub 372 are keyed to the forwardly extending end of the drive shaft 28 by means of a key 374 and a slot 376, and the hub 372 is secured to the drive shaft 28 by means of a bolt 378 that extends through the hub 372 and is threaded into the end of the drive shaft 28. A retaining washer 380 is fastened to the end of the hub 372, also by the bolt 378, and retains the discs 366 and 368 on the hub 372. The intermediate disc 366 is secured to the disc 364 by means of a pin 382 that extends through the discs 364, 366. Formed about the periphery of the intermediate disc 366 are a plurality of relatively coarse teeth 384, the diameter of the intermediate disc 366 being less than the diameter of the disc 364 by an amount illustrated in FIGURE 33 such that when the drive roll 36 is pressing and feeding the rib R and the insole I, the relatively coarse teeth 384 of the intermediate disc 366 are in contact with the fold 361 of the rib R and the relatively sharp teeth 370 of the disc 364 are slightly penetrating the minor base 365 of the rib R, the effect being that the teeth 370 of the disc 364 provide the primary feeding force while pressing the insole and rib together, and the relatively coarse teeth 384 of the intermediate disc 366 effect a pressing of the rib to the insole without imparting any substantial feeding force. The outer disc 368 has a smooth surface 386 formed about its circumference and is of a diameter such that when the teeth 370 and 384 of the other discs 364 and 366 are in proper engagement with the rib R the smooth surfaced periphery 386 of the disc 368 will serve primarily to press the insole and rib together. Thus it may be seen that when the drive roll 36 is assembled the smaller diameter of the intermediate disc 366 serves to define a recess 388 which is adapted to receive the folded portion 361 of the rib R.

The primary function of the relatively coarse teeth 384 of the intermediate disc 366 is to aid in the feeding of the rib R through the space 362 provided between the heater 348 and drive roll 36. It may be appreciated that when the rib R enters this space 362 it will be of a stiffness such that the fold 361 will not lie flat as in FIGURE 33 but will tend to spring away from the base portions 363, 365 as shown in FIGURE 57 so that as the rib enters the space 362 the fold 361 of the rib R may protrude into the recess 388 and be engaged by the relatively coarse teeth 384 of the intermediate disc 366. This engagement of the coarse teeth with the fold 361 of the rib R tends to provide a more positive gripping of the rib R by the drive roll 36 and thus reduce slippage therebetween. As the movement of the rib R progresses through the continually narrowing space 362 the fold 361 is pressed more closely to the major base 363 of the rib and the sharper teeth 370 of the disc 364 engage the minor base 365 of the rib R which aids considerably in the feeding of the rib through the slot 362.

In the aforesaid manner the drive roll 36 tightly draws the rib R about its periphery and feeds the rib R past the cylindrical surface 350 of the heater 348 to activate the thermoplastic adhesive thereon in readiness of attachment of the rib R to the insole I. The lower portion of the heater 348 is disposed as close to the bottom of the drive roll 36 as is practicably possible so that as the rib R exits from the space 362 it may be positively guided to the line of attachment 42. As the rib R reaches the line of attachment 42 it is laid down and pressed firmly against the insole I which is simultaneously being fed past the line of attachment 42 and the force with which the head 16 and hence the drive roll 36 is urged downwardly causes the drive roll 36 to effect a firm pressing of the rib R to the insole I. It should be noted here that as the rib R is pressed into engagement with the insole I the tacky character of the activated thermoplastic adhesive causes the rib R to be bonded to the insole I quickly, this initial bond being sufficient to aid in precluding slippage between the rib and the insole as they are simultaneously fed past the line of attachment 42. It may be appreciated that, due to the particular construction of the drive roll 36, the major pressing and driving force will be applied to the rib and insole by the teeth 370 of the inner disc 364 penetrate the minor base 365 and provide a firm grip. The combination of the penetration of teeth 370 into the rib R and the force with which drive roll 36 presses downwardly to grip the rib and insole is such that when the insole is caused to rotate by means of the thrusters 120, 122 or the engagement of the insole with the edge gage 44 the insole and rib to tend to pivot about the point where the teeth 370 engage the rib R, this point having been referred to earlier as the insole pivot point P (see FIGURES 33 and 55). The firm grip that is afforded by the teeth 370 of the disc 364 precludes slipping of the rib R, it being noted that any slippage that occurs between the rib R and the drive roll 36 will occur where the rib R is contacted by the discs 366 which do not penetrate the rib surface.

Figure 55:
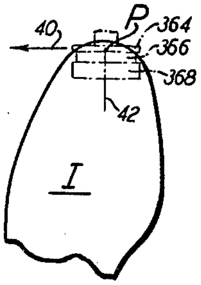
FIGURE 55 is a substantially schematic illustration of the relationship of the drive roll and insole as viewed from above with the drive roll being illustrated in phantom.

Referring to FIGURES 28 and 55 it may be seen that, in order to maintain the insole in paralleling orientation, it is necessary to turn the insole in a counterclockwise direction about the pivot point P. As the insole is so turned in a counterclockwise direction by the thrusters it should be appreciated that the discs 366 and 368 of the drive roll 36, which rotates in unison with the disc 364, will tend to oppose the counterclockwise rotation of the insole I, that is the discs 366 and 368 which are in pressing engagement with the rib R also tend to urge the rib and insole along the direction of feed 40 thus tending to urge the insole in a clockwise direction about the pivot point P. The peripheral surfaces of the discs 366 and 368 however cannot grip the rib to the extent that the sharply toothed periphery of the disc 364 does so that a certain amount of slippage between the rib R and the discs 366 and 368 is permitted as the insole I is caused to be rotated counterclockwise. From this it may also be apparent that when the insole is being rotated in a clockwise direction, the portions 361, 363 of the rib that are in engagement with the discs 366 and 368 will tend to move at a greater speed than the discs themselves. In the same manner as when the insole is being rotated in a counterclockwise direction, the rib R is permitted to slip with respect to the discs 366 and 368 so as not to preclude the desired clockwise rotation of the insole. The smooth peripheral surface 386 of the disc 368 facilitates this slipping of the rib and also serves to more effectively iron down the major base 363 with which it is in engagement. This ironing down function is particularly desirable when operating on relatively sharply curved portions of the insole, such as at the toe end thereof when there is a pronounced tendency for the rib to become bunched up and pleated.

Figure 56:
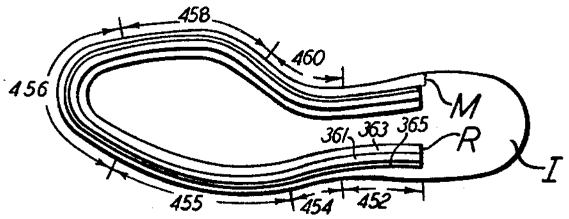
FIGURE 56 illustrates a right insole with the rib attached thereto.
Figure 49:
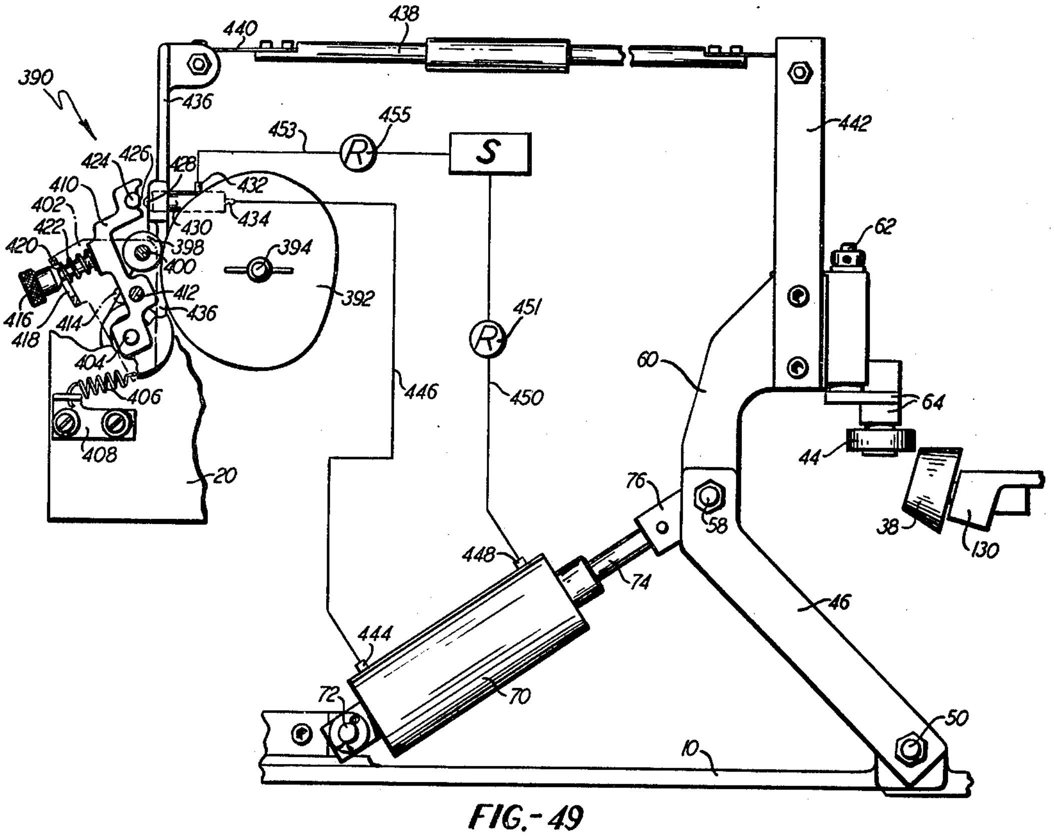
FIGURE 49 is a partially schematic illustration of the margin control unit and its association with the edge gage.

As may be seen from FIGURE 56 it is desirable to apply the rib R to the insole I in such a manner that the marginal distance M between the rib R and the periphery of the insole I may be varied. The instant machine effects such a variation by urging the edge gage in a forward or rearward direction. This forward-rearward urging of the edge gage 44 is effected by means of the motor 70 which upon actuation will cause the brackets 46 and 48 together with all the members supported thereon (including the edge gage 44 and the thruster control unit 68) to pivot about the pin 50. The actuation of the motor 70 is controlled by a margin control unit 390 that is mounted to the rearward end of the head 16. Referring to FIGURES 1, 2, 5, 11 and 49, it may be seen that the margin control unit 390 includes a cam 392 that is secured to the outwardly protruding end of a shaft 394 which in turn is rotatably supported in the head 16 by means of bearings 396. A cam follower 398, that is engageable with the periphery of the cam 392, is rotatably mounted by a pin 400 to a support plate 402 which in turn is pivotally mounted on a rod 404. The rod 404 is supported within a bushing 403 which in turn is securely mounted to the sidewall 20 of the head 16. The support plate 402 is biased towards the cam 392 by a tension spring 406 that is connected to the sidewall 20 by means of a clip 408 so that the cam follower 398 may be maintained in continuous engagement with the cam 392. A bracket 410 is also pivotally mounted on the rod 404 and extends upwardly therefrom, there being a locking screw 412 that extends through the support plate 402 and is threaded into the bracket 410 to enable the bracket 410 to be adjustably pivoted with respect to the support plate 402 to a desired position (described below) and thereafter be locked in that position. A slot 414 is formed in the support plate 402 for accommodation of the locking screw 412. The pivotal adjustment of the bracket 410 with respect to the support plate 402 is effected by means of an adjusting screw 416 which extends through a slot 418 that is formed on an extension 420 of the support plate 402. The adjusting screw 416 is threaded into the bracket 410 and a compression spring 422 encircles the adjusting screw 416 between the bracket 410 and the extension 420, from which it may be seen that upon loosening of the locking screw 412 the adjusting screw 416 may be adjusted to vary the angular position between the bracket 410 and the cam follower 398 which is mounted on the support plate 402. Secured to the bracket 410 and extending into the head 16 is a rod 424 having a flat surface 426 formed thereon. The flat surface 426 of the rod 424 is intended to cooperate with the outlet orifice 428 of a valve 430 that is similar in construction to the valves 196 and 198, and has an inlet 432 and a feed back outlet 434. The valve 430 is secured to the midportion of an upwardly extending finger 436, which is disposed interiorly of the head 16 and is pivotally journaled at its lower end on the bushing 403 by means of journals 437. A rod 438 is connected to the upper end of the finger 436 by means of a leaf spring 440 and extends forwardly therefrom where it is secured to an upwardly extending bar 442 which in turn is secured to the bracket 46. The feed back outlet 434 of the valve 430 is connected to the inlet 444 at the head end of the motor 70 by means of a line 446 and air under a constant relatively low pressure is in communication with the right end of the motor 70 from a source S by means of an inlet 448, a line 450 and a low pressure regulator 451. The inlet 432 of the valve 430 is in communication with the source of air S under a pressure that is higher than that in the right end of the motor 70, by means of a line 453 and a high pressure regulator 455. It may thus be seen that as the cam 392 is rotated, its contour may cause the cam follower 398 and hence the support plate 402 and bracket 410 to pivot forwardly or rearwardly about the rod 404 thus causing movement of the flat surfact 426 of the rod 424 towards and away from the outlet orifice 428 of the valve 430 to vary the amount of obstruction that is presented to the outlet orifice 428 which in turn varies the pressure in the feedback outlet 434 of the valve 430 and hence the pressure of the air that is directed to the left end of the motor 70 by means of a line 446. It may be appreciated that this system tends to maintain equilibrium of the pressures in the right and left ends of the motor 70; that is if the pressure in the right end of the motor 70 through the line 450 is maintained at a constant relatively low pressure and the pressure at the inlet 432 of the valve 430 is maintained at a constant relatively high pressure, movement of the bracket 410 and the rod 424 towards the valve 430 will tend to obstruct the outlet orifice 428 of the valve 430 with a resulting rise in pressure in the line 446 and in the left end of the motor 70. Thus, assuming that the motor 70 was initially in equilibrium (there being an initial relatively low pressure directed through the line 450 to the right end of the motor 70) restrictions of the outlet orifice 428 of the valve 430 will cause the pressure in the left end of the motor through the line 446 to exceed said relatively low pressure, thus actuating the motor 70 to cause clockwise pivoting of the brackets 46, 48 and hence forward urging of the edge gage 44. This movement of the brackets 46, 48 also causes the rod 438 to swing the finger 436 in a clockwise direction about the rod 404 which will move the valve 430 forwardly away from the flat 426 of the rod 424 and decrease the obstruction that is presented to the valve 430 by the flat 426. As the obstruction is decreased the pressure in the line 446 and right end of the motor 70 will be similarly decreased until the pressure in the left end of the motor through the line 446 is returned to said relatively low pressure and the motor 70 will be in equilibrium. The converse is true in that rearward movement (counterclockwise as seen in FIGURE 49) of the rod 424 will tend to decrease the pressure in the left end of the motor 70 through the line 446 to cause the edge gage 44 and finger 436 to be urged rearwardly until the obstruction that is presented to the valve 430 by the rod 424 has been increased to a degree where the relatively low pressure is restored through the line 446 to the left end of the motor 70.

Figure 56A:
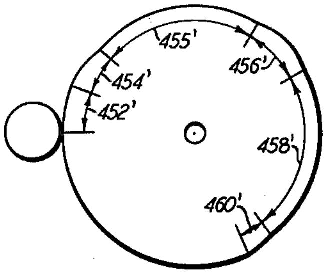
FIGURE 56A illustrates a cam used in the margin control unit to vary the margin of the insole rib illustrated in FIGURE 56.

Referring to FIGURE 56 it may be seen, by way of illustration, that the insole to be fabricated has a relatively wide margin M along the portion 452 and begins to decrease along the portion 454 thereof. This decreased margin is maintained constant in the region 455 until the toe region 456 of the insole is approached where the margin M is increased and then decreased slightly. The margin M is then maintained constant in the region 458 whereupon it begins to increase at the portion 460. The cam 392 in FIGURE 49 is shown in its starting position and the portions of the cam that are intended to effect the margin control of the aforementioned portions of the insole are indicated in FIGURE 56A by like reference characters followed by a prime mark ('). The initial change in the width of the margin M is along the portion 454 of the insole where the margin is to be decreased. The portion 454′ of the cam 392 is of a continually reducing radius so as to enable the rod 424 to move forwardly and obstruct the outlet orifice 428 of the valve 430 which will cause an increase in the pressure in the right end of the motor 70 through the line 446 and effect the desired forward urging of the edge gage 44. It is important to note that the force with which the rib and insole are pressed together by the drive roll 36 and idler roll 38 does not readily permit the insole to slide forwardly or rearwardly therebetween in response to the forward urging of the edge gage, so that in order to decrease the margin M it is necessary to effect rotation of the insole about the pivot point P in a clockwise direction. This results in the insole being disposed in a slight concave orientation but, as will be described below, this condition is only temporarily maintained until the margin M has been decreased to the extent desired. Thus as the brackets 46, 48 are urged forwardly by the motor 70 the edge gage 44 will be urged against the periphery of the insole under an increasing force, the effect of which is to swing the pivot bar 216 of the thruster control unit 68 in a direction tending to increase the obstruction presented to the valve 198 and decrease the obstruction presented to the valve 196 which will urge the thrusters 120, 122 in a clockwise direction. The clockwise rotation of the thrusters 120, 122 will enable the insole I to be rotated in a clockwise direction under the influence of the dragging of the periphery of the insole about the edge gage 44 and the clockwise torque that is applied to the insole by the frusto-conically shaped idler roll 38. If the contour of the periphery of the insole is such that it is already in concave orientation while the margin M is being decreased the clockwise torque of the idler roll 38 should be sufficient to effect the desired clockwise rotation of the insole I, the thrusters 120, 122 being moved clockwise so as not to interfere with the insole. When the margin M is intended to be increased, as for example when being applied to the portion 460 of the insole I, the rise in corresponding cam portion 460′ will cause the motor 70 to urge the brackets 46, 48 rearwardly thus tending to withdraw the edge gage 44 from the insole I. The effect of this is to relieve the pressure of the edge gage 44 on the insole thus enabling the compression spring 230 to swing the pivot bar 216 to a position to where the obstruction to the valve 196 is increased and the obstruction to the valve 198 is decreased which will cause the thrusters 120, 122 to rotate in a counterclockwise direction. The configuration of the cam 392 is such that the rearward movement of the brackets 46, 48 is sufficient to relieve the pressure between the edge gage 44 and the insole I to an extent such that the thrusters will urge the insole counterclockwise to a slightly convex orientation. As the insole is in this slightly convex orientation the continued feeding of the insole along the direction of feed 40 will cause the width of the margin M to be increased accordingly.

Figure 13:
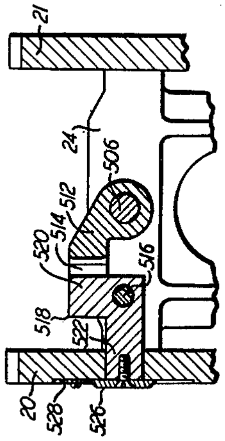
FIGURE 13 is a sectional illustration of the size adjustment mechanism as viewed along the line 13—13 of FIGURE 10.

Referring to FIGURES 2, 5, 6 and 48, secured to the shaft 394 inside the head 16 is a collar 462, and a timing disc 464 is in turn secured to the collar 462 for rotation in unison with the shaft 394 and the cam 392. A friction wheel 466 is engageable with the surface of the timing disc 464 and serves to drive the timing disc 464, shaft 394 and cam 392. A housing 468 having a pair of downwardly extending legs 470, 472 is disposed between the bulkheads 22 and 24 of the head 16. The housing legs 470 and 472 are fitted with journals 474 and 476 through which is received the main drive shaft 28. A shaft 478 is rotatably supported in the housing 468 by means of journals 480, 482 and has a rearwardly extending end that protrudes through the bulkhead 24 towards the shaft 394. Secured to the forward end of the shaft 478 is a gear 484 which is in constant mesh with a gear 486 which is secured to the main drive shaft 28 by means of a pin 488, wherefrom it may be seen that as the drive shaft 28 is rotated the shaft 478 will also be rotated in the opposite direction. The friction wheel 466 is keyed to the rearwardly extending end of the shaft 478 by means of a key 490 and a slot 492 so that the wheel 466 may rotate in unison with the shaft 478 and may be moved lengthwise along the shaft 478. The housing 468 may swing about the drive shaft 28 laterally so that the friction wheel 466 may be urged towards and into engagement with the surface of the timing disc 464 or away from the timing disc so as to be out of engagement therewith. This movement is effected by means of an air operated motor 494 (FIGURES 2 and 48) that is pinned to the side of the head 16 and has a downwardly extending piston rod 496 which in turn is pivoted at the pin 498 to a laterally extending lug 500 that is rigidly secured to the housing 468. Actuation of the motor 494 to extend the piston rod 496 downwardly will rotate the housing 468 towards the sidewall 21 to effect engagement of the friction wheel 466 with the timing disc 464 and cause simultaneous rotation of the shaft 394 and cam 392. A compression spring 501 is interposed between the sidewall 21 and the housing 468 to normally bias the friction wheel 466 away from the timing disc 464, the force of the spring 501 being overcome by the motor 494. For purposes apparent below, when operating on insoles of varying size and shape it is necessary to change the speed of rotation of the shaft 394 accordingly so that when operating on a large insole having a longer rib R the timing disc 464 and cam 392 may turn at a slower speed and when a relatively short rib is to be applied to the insole the speed of rotation of the shaft 394 may be increased. This variation in speed of rotation of the shaft 394 is caused by varying the position of the friction wheel 466 along the rearwardly extending end of the shaft 478 so that when the housing 468 is rotated to cause the friction wheel 466 to engage the timing disc 464 the point of contact between the disc 464 and friction wheel 466 will determine the rotary speed of the shaft. The position of the friction wheel 466 is varied by means of a yoke 502 (see FIGURE 7) that is engageable with a groove 504 that is formed about the periphery of the friction wheel 466. The yoke 502 is secured to and suspended from the rearwardly extending end of a rod 506 which in turn is slidably contained within bearings 508, 510 located in the bulkheads 24, 22 and for movement in a forward-rearward direction. A block 512 having laterally extending bifurcations 514 is rigidly secured to the rod 506. A forwardly-rearwardly extending screw 516 (see also FIGURE 13) is rotatably journaled between the bulkheads 22, 24 and is disposed below the bifurcations 514 of the block 512. A second block 518 is threaded onto the screw 516 and has an upwardly extending end 520 that is contained between the bifurcations 514 of the block 512. A laterally extending portion 522 of the block 518 is contained within a slot 524 (FIGURE 10) formed in the sidewall 20, the engagement of the slot 524 with the block 518 serving to preclude rotation of the block 518. It may be seen therefrom that as the screw 516 is rotated, the blocks 518, 512 will move in a forward-rearward direction thus moving the rod 506 and the friction wheel 466 therewith to the desired position. A pointer 526 may be secured to the protruding end 522 of the block 518 and may be associated with a scale 528 for facilitating proper adjustment of the machine for operation on a particular size insole.

Figure 12:
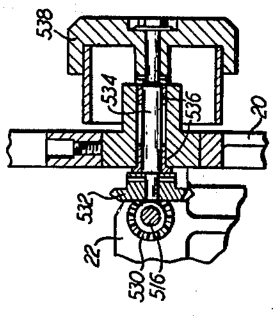
FIGURE 12 is a sectional illustration of the size adjustment mechanism as viewed along the line 12—12 of FIGURE 10.
Figure 11:
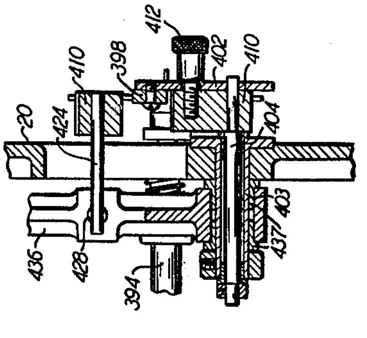
FIGURE 11 is a sectional view taken along the line 11—11 of FIGURE 10 and illustrating the construction of the margin control unit.

The rotation of the screw 516 is effected by means of a bevel gear 530 that is secured to the screw 516 and which meshes with another bevel gear 532 which in turn is securely pinned to a shaft 534 (FIGURE 12) that is rotatably mounted to the sidewall 20 at journals 536. The other end of the shaft 534 extends outwardly of the sidewall 20 and is rigidly connected to a hand wheel 538.

Referring to FIGURES 5 and 6 it may be seen that rotation of the shaft 394 in a clockwise direction as seen in FIGURE 6 is limited by means of a pin 540 that is secured to the sidewall 21 and extends inwardly therefrom. The pin 540 is engageable with a finger 542 which is secured to the shaft 394. During operation of the machine the friction wheel 466 causes the timing disc 464, shaft 394 and the cam 392 to rotate in a counterclockwise direction (as seen in FIGURE 6). A ring 544 is rotatably mounted between the timing disc 464 and the collar 462. Projecting radially from the ring 544 is a bar 546 the outermost end 547 of which protrudes beyond the circumference of the timing disc 464 (see also FIGURE 8). A shoulder 548 is formed about the periphery of the timing disc 464, and the bar 546 may be rigidly secured in any desired angular position on the timing disc 464 by means of a wing nut 550 and an L-shaped bolt 552 that extends through the end of the bar 546 and grips the shoulder 548 formed on the circumference of the timing disc 464. As the cycle of operation of the machine progresses the timing disc 464 will be rotated until the projecting end 547 engages and actuates an actuating member 554 of a switch 556. The switch 556, as will be later described, is interposed in the control circuit so as to effect actuation of the motor 356 to cause the rib R to be gripped and severed in the aforementioned manner.

A mechanism 558 is provided for resetting the timing disc 464, shaft 394 and cam 392 to their idle positions after the cycle of operation of the machine has been completed. Referring to FIGURES 1, 2, 10 and 31 it may be seen that the resetting mechanism 558 includes a first gear 560 that is secured to the outwardly protruding end of the shaft 394. This first gear 560 is in mesh with a second larger gear 562 that is rotatably mounted to the sidewall 20 by a shaft 564. A smaller, third gear 566 is secured to the second gear 562. This third gear 566 is in mesh with a fourth and larger gear 568 which is also rotatably mounted to the sidewall 20 by means of a shaft 570. These gears 560, 562, 566 and 568 are covered by a plate 572 which is fastened to bosses 574 on the sidewall 20. A threaded stud 576 is secured to the fourth gear 568 and extends laterally therefrom through a slot 578 that is formed in the cover plate 572. The shaft 570 to which the fourth gear 568 is mounted extends through the plate 572 and a lever 580 is pivotally mounted to the protruding end of the shaft 570. The lever 580 also accepts the threaded stud 576 of the fourth gear 568 and is secured thereto by the nut 582. The upper end of the lever 580 is connected at a pin 584 to the piston rod 586 of a motor 588, the motor 588 in turn being pivotally mounted to the sidewall 20 by means of a pin 590 and a bracket 592. During the operation of the machine the rotation of the shaft 394 causes, by means of the aforementioned gears, the piston rod 586 of the motor 588 to be withdrawn in a rearward direction. In order to minimize frictional resistance and the like, air under relatively low pressure may be introduced to the head end (the right end in FIGURE 10) of the motor 588 to facilitate the rearward withdrawal of the piston rod 586 as the friction wheel 466 causes the shaft 394 to rotate. When the cycle of operation of the machine has been completed the control circuit causes higher pressure air to be introduced to the rod end (the left end in FIGURE 10) of the motor 588 to swing the lever 580 and hence the fourth gear 568 in a clockwise direction as seen in FIGURE 31 to thereby effect clockwise rotation of the shaft 394. The clockwise rotation of the shaft 394 will terminate when the finger 542 has engaged the pin 540 at which time this portion of the machine is in readiness to begin a new cycle of operation.

Figure 38:
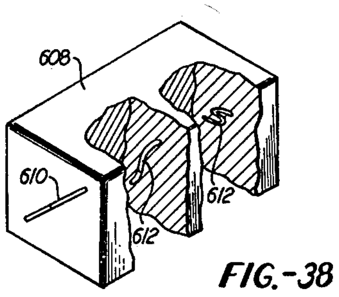
FIGURE 38 is a broken away view of the rib forming block.
Figure 39:
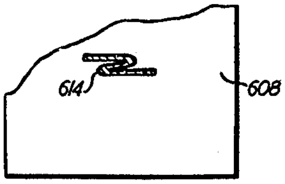
FIGURE 39 is an end view of the exit end of the rib forming block.
Figures 43, 44, 45, 46, 47:
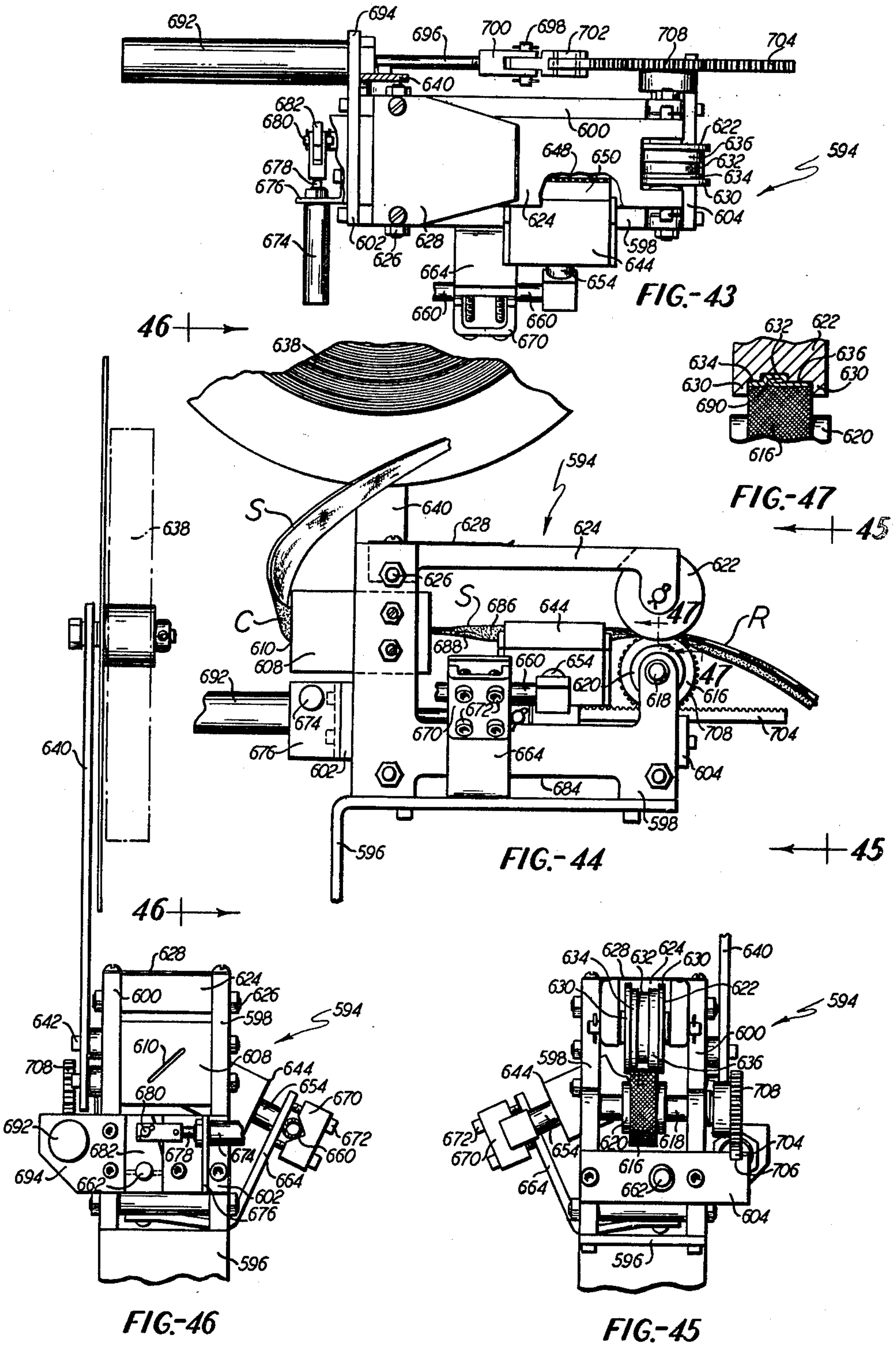
FIGURE 43 is a plan view of the rib forming unit.
FIGURE 44 is a side elevation of the rib forming unit illustrating a rib being formed therein.
FIGURE 45 is an end view of the rib forming unit as viewed from the line 45—45 of FIGURE 44.
FIGURE 46 is an end view of the rear end of the rib forming unit as viewed along the line 46—46 of FIGURE 44.
FIGURE 47 is a sectional view of the precision folding rolls as viewed along the line 47—47 of FIGURE 44.
Figure 48:
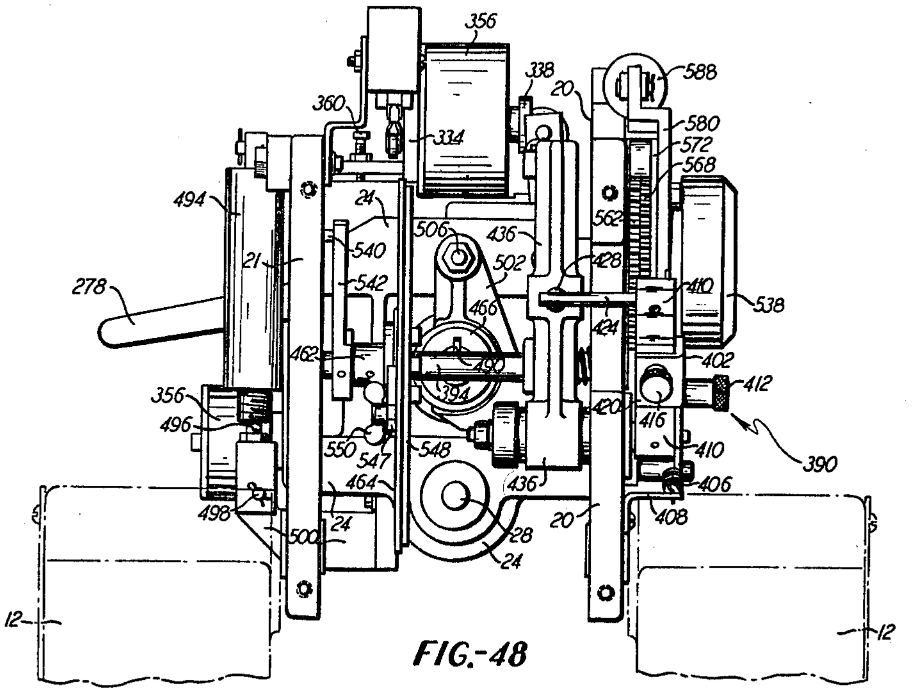
FIGURE 48 is a view of the rear of the head with the transmission removed and as viewed along the line 48—48 of FIGURE 2.

Referring to FIGURES 1 and 43 through 47, incorporated into the machine is a rib folding unit 594 which functions to fold a flat strip S of thermoplastic-coated rib material into the desired rib configuration shown, for example, in FIGURE 47. The rib folding unit 594 is mounted on a bracket 596 which in turn is secured to the rearward portion of the head 16. The rib folding unit 594 includes a pair of side frames 598, 600 and end plates 602 and 604. Disposed between and secured to the rearward portion of the side frames 602, 604 is a folding block 608 that is adapted to receive the flat, unfolded strip S at its inlet end 610 and guide the strip S through a passageway 612 formed within the block 608 to the outlet end 614 of the block 608 (FIGURES 38 and 39). The passageway 612 of the block 608 is so contoured that as the strip S progresses therethrough it will be progressively folded from its flat strip condition to the S-shaped configuration at the outlet end 614 of the passageway 612. A knurled feed roll 616 is rotatably mounted to the forward end of the side frames 598, 600 by means of a shaft 618 that is rotatably supported between the side frames 598, 600. The feed roll 616 is mounted to the shaft 618 by means of a clutch 620 which serves to permit rotation of the feed roll 616 in a clockwise direction as seen in FIGURE 44. A shaping roll 622 is rotatably mounted to the forwardly extending end of a pressure arm 624 which is pivotally mounted at its rearward end to the rearward portion of the side frames 598, 600 at a pin 626. A leaf spring 628 is secured to the rearward end of the side frames and serves to urge the pressure arm 624 and shaping roll 622 downwardly towards the feed roll 616. The shaping roll 622 has a pair of flanges 630 that embrace the feed roll 616 for a purpose later described. A groove 632 is formed about the shaping roll 622 and shoulders 634 and 636 are also formed on the shaping roll 622 so as to be disposed between the groove 632 and the flanges 630.

The precoated strip material S, in roll form 638, is rotatably supported by an upwardly extending support member 640 which in turn is secured by bolts 642 to the side frame 600. In progressing through the rib folding unit 594 the strip S is drawn from the roll 638 into the inlet end 610 of the folding block 608 and passes from the outlet end 614 of the block 608 forwardly between the feed roll 616 and the shaping roll 622. It should be noted that the adhesive coating C on the strip S renders the strip S relatively resilient so that as the strip passes out of the outlet end 614 of the block 608 it will tend to partially unfold (see FIGURES 40 and 44). The folding block 608 thus serves as a rough folder whereas, as described below, the cooperation of the feed roll 616 and the shaping roll 622, as the roughly folded rib passes therebetween, serves to effect a precision folding of the strip S to its final rib configuration.

Figure 40:
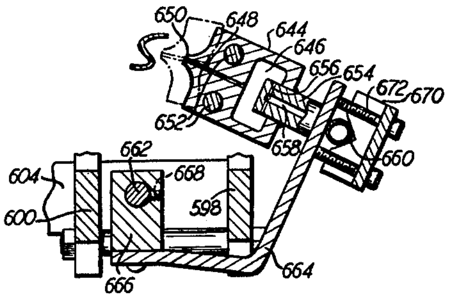
FIGURE 40 is a sectional view of the heater block and illustrating its position in phantom when in an operating configuration.

Disposed along the path of travel of the strip S as it moves from the folding block 608 to the feed and shaping rolls 616 and 622 is a heater block 644. Referring to FIGURES 40, 43 and 44 it may be seen that the heater block 644 defines a hollow mixing chamber 646 and has a plurality of passageways 648 that extend from the chamber 646 to a tapered nozzle 650. Heaters 652 are provided within the block 644. A ferrule 654 is secured to the block 644 and protrudes into the chamber 646. A plurality of radial passageways 656 are formed within the protruding end of the ferrule 654 and are in communication with a centrally disposed passageway 658 formed within the ferrule 654. The ferrule 654 is in turn secured to a tube 660, the passageway 658 of the ferrule 654 being in communication with the tube 660. The tube 660 is in communication with a source of air. Thus air may flow from the source through the tube 660, the ferrule 654 and out of the radial passageways 656 into the mixing chamber 646 of the heater block 644. The arrangement of radial passageways 656 and the outlet orifices 648 is such that air that flows through the mixing chamber 646 will become mixed therein, to heat the air within the chamber 646 more uniformly.

The heating block 644 is mounted to the rib folding unit 594 for pivotal movement that is towards and away from the path of travel of the strip S by means of a shaft 662 that is pivotally mounted at its ends to the end plates 602 and 604 so that the axis of rotation is disposed along a substantially forward-rearward line. A substantially L-shaped bracket 664 is secured to the shaft 662 by means of a block 666 and set screw 668. A V-block 670 is fastened to the upwardly extending end of the bracket 664 by means of screws 672 and serves to grip the tube 660 to secure the heater block 644 to the bracket 664 for movement therewith. When in an idle position the bracket 664 rests on the bracket 596 (see FIGURE 44) and is in its most clockwise position as seen in FIGURES 40 and 46 to maintain the nozzle 650 substantially remote from the path of travel of the strip S. Pivotal movement of the heater block 644 towards the strip S (to the position shown in phantom in FIGURE 40) is effected by means of an air operated motor 674 that is secured to the end plate 602 by means of a bracket 676 and has a laterally extending piston rod 678 that is pivotally connected at a pin 680 to an upwardly extending lever 682 which in turn is secured to a rearwardly extending portion of the shaft 662. It may thus be seen that as the motor 674 is actuated to extend the piston rod 678, the lever 682 and shaft 662 will rotate counterclockwise (as seen in FIGURE 46) until the L-shaped bracket 664 engages a surface 684 (FIGURE 44) of the side frame 598 whereupon the heater block 644 will be disposed in proximity to the path of travel of the strip S.

Figure 41:
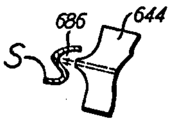
FIGURE 41 is a substantial schematic illustration of the manner in which the roughly formed rib is heated as it leaves the exit of the forming block.

As the strip S travels past the nozzle portion 650 of the heater block 644 the attitude of the passageways 648 with relation to the travelling strip is such that the heated air is directed from the nozzle 650 so as to initially be directed into a trough 686 of the strip (see FIGURE 41). As the strip S continues its forward movement, the passageways 648 are so oriented as to direct the flow of heated air just above a folded portion 688 of the strip so that the air may initially heat the folded portion 688 and then flow past the trough 686. This mode of heating of the strip S is effected by disposing the heater block 644 such that the more rearward of the passageways 648, that initially heat the strip S, are disposed at a higher level than the more forward of the passageways 648 that heat the strip S just before it travels past the heating block 644 and to the rolls 616 and 622. This method of heating the strip serves a twofold purpose in that the thermoplastic coating C, when activated, renders the entire strip less resilient and more pliable and also serves to activate the fold 688 so that when the rib R is precision folded between the rolls 616 and 622, a bond will be formed at the juncture 690 of the fold 361 and the major and minor base portions 363 and 365 of the rib R as well as between the layers of the material forming the fold 361 (see FIGURES 47 and 57). It should also be noted that just before the rib R passes between the rolls 616 and 622, the nozzle 650 is in close proximity to the fold 688 of the strip S which results in a slightly higher temperature at the fold 688, this temperature being sufficient to activate the adhesive to a degree where a good bond will be insured at the juncture 690. The air is directed towards the fold 688 in such a manner that it may thereafter flow into the trough 686 so as to maintain the already softened thermoplastic coating C in its softened condition (not necessarily activated to the point where an effective bond may be made).

As the strip S passes between the feed roll 616 and shaping roll 622 to shape the rib R it may be seen from FIGURE 47 that the rib R is pressed into the groove 632 formed on the shaping roll 622, the width of the shoulders 636 and 634 determining the size of the major and minor base portions 363 and 365 of the rib R. The soft character of the strip S after having traveled past the heater block 644 enables it to shift its orientation between the rolls so as to become accommodated by the shoulders 634, 636 and the groove 632 on the shaping roll 622.

The strip S is drawn through the rib forming unit 594 by means of the drive and feed rolls 36 and 266 in the rib feeding unit 26. The rib is guided from the rolls 616, 622 to the slot 264 of the rib feeding unit 26 by a roller 689 that is rotatably supported from an arm 691 which is in turn secured to and extends laterally from the end cap 262. The roller 689 is disposed at an elevation that is below that of the rolls 616, 622 (see FIGURE 1) so that as the rib R travels from the rolls 616, 622 to the roller 689, it will do so in a downward direction. This downwardly inclined path of travel of the rib R causes a slight wrapping of the precision-formed rib R about the feed roll 616 which tends to maintain the fold 361 of the rib R flat against the base portions 363, 365 for a short period of time after the rib R exits from between the rolls 616, 622. Although the duration of this wraparound is relatively short it is sufficient to enable the adhesive to partially cure and harden to the point where a bond at the juncture 690 will be formed.

Secondary rib advancing means are provided in the rib forming unit 594 to advance the rib R a predetermined and relatively short distance for a purpose later described. This secondary rib advancing means includes an air operated motor 692 that is secured to an extending portion 694 of the end plate 602 and has a forwardly extending piston rod 696 which is pivotally connected by means of a pin 698 and clevises 700 and 702 to a forwardly extending rack 704. The rack 704 is supported for forward and rearward sliding movement in a slot 706 formed in an extension of the end plate 604. The rack 704 is in engagement with a pinion 708 that is in turn secured to a protruding end of the shaft 618. Normally the piston rod 696 of the motor 692 is extended so that the rack 704 is in its most forward position. When the motor 692 is actuated to retract the piston rod 696 and move the rack 604 rearwardly, the pinion 708 and the shaft 618 will be rotated in a clockwise direction as seen in FIGURE 44. This direction of rotation locks the clutch 620 and causes the feed roll 616 to rotate in unison with the shaft 618 thus feeding the rib R the desired distance, which is governed by the stroke of the piston rod 696. When returned to its normal position, the motor 692 urges the rack 704 forwardly during which time the clutch 620 will slip and no rotary movement will be transmitted to the feed roll 616.

Figure 10:
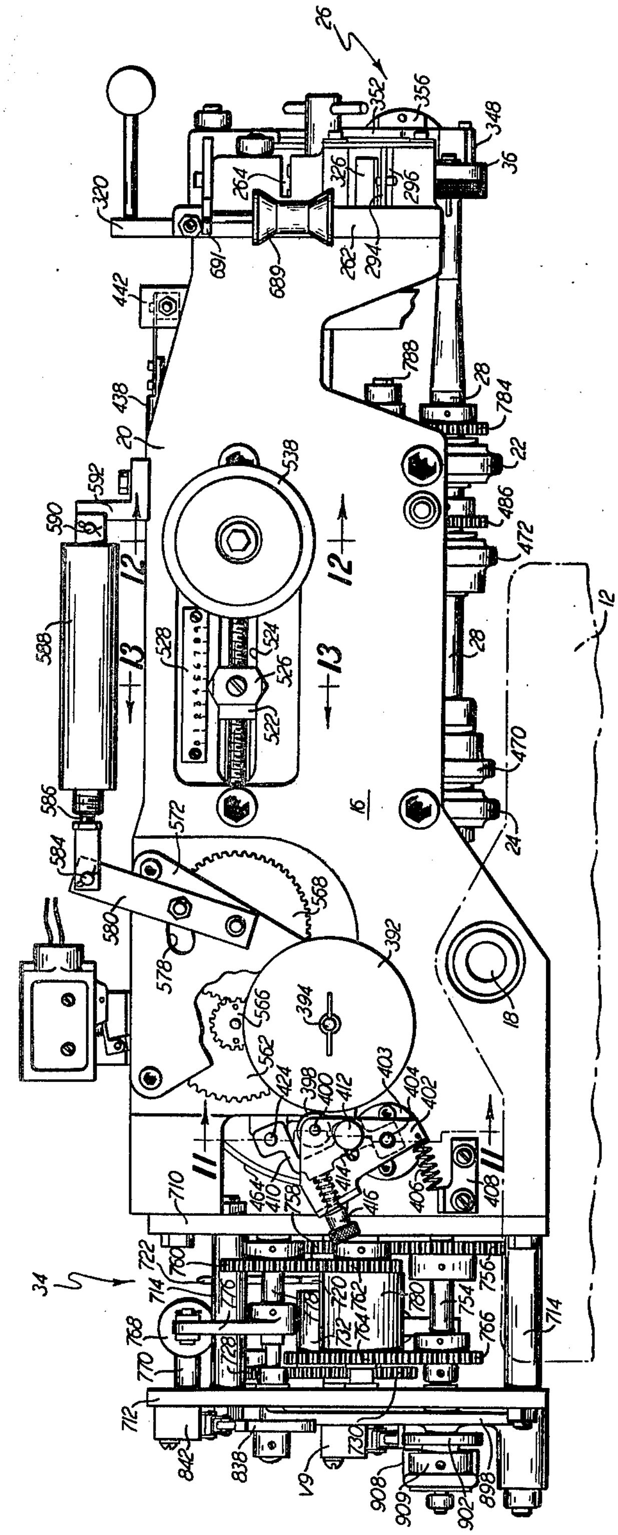
FIGURE 10 is a more detailed side elevation of the head.
Figure 50:
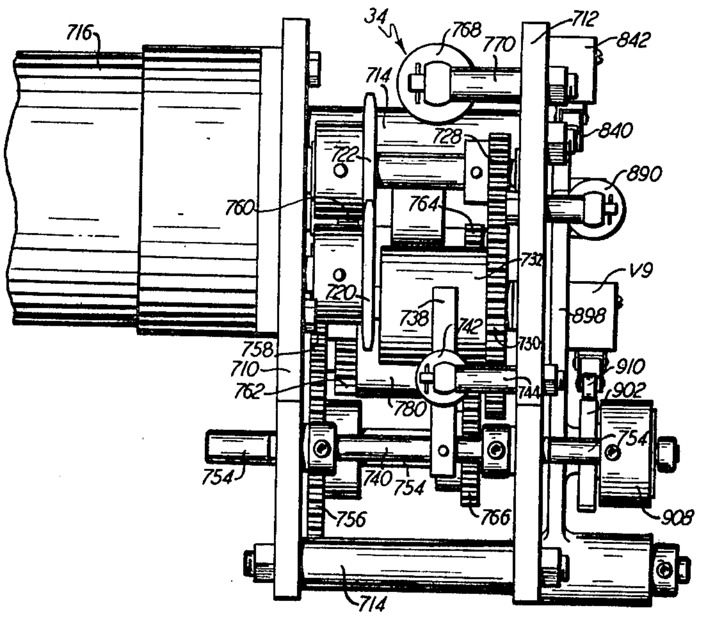
FIGURE 50 is a side elevation of the transmission as viewed from the line 50—50 of FIGURE 52.
Figure 51:
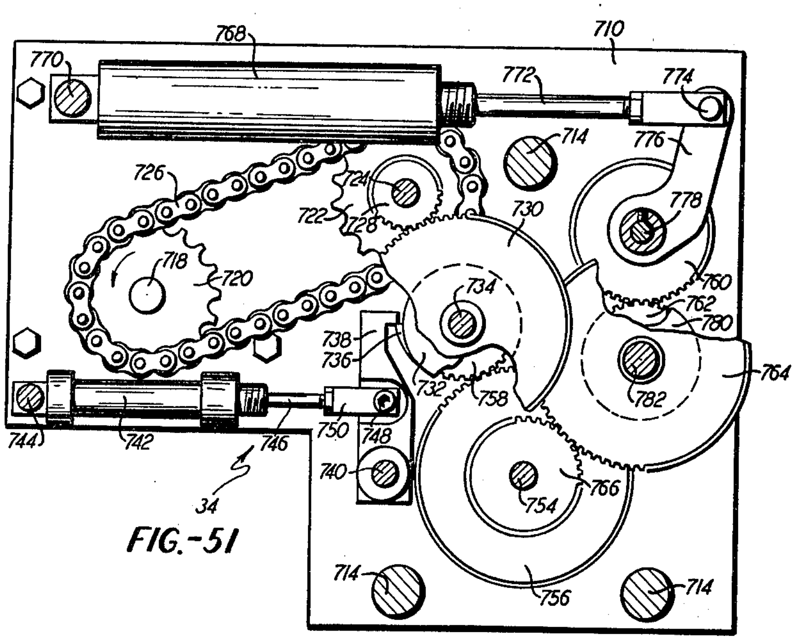
FIGURE 51 is a broken away illustration of the transmission as viewed from the line 51—51 of FIGURE 52.
Figure 52:
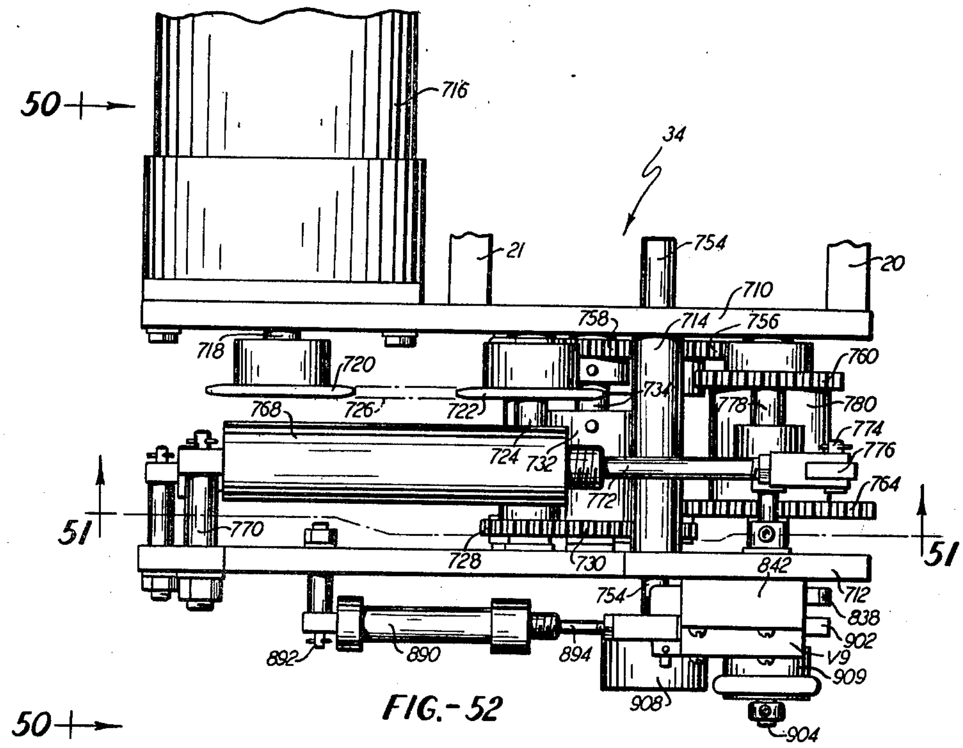
FIGURE 52 is a plan view of the transmission.

Referring to FIGURES 10, 50 and 51, the main drive and transmission 34 is mounted to the rearward portion of the head 16 and includes a front bearing plate 710 and a rear bearing plate 712 which are secured to each other and spaced by means of bolts 714 and between which are contained the main drive and transmission. A motor 16 is secured to the front bearing plate 710 and has an output shaft 718 that extends rearwardly between the bearing plates 710, 712, there being a sprocket 720 secured to the output shaft 18. A driven sprocket 22 is secured to a shaft 724 which is in turn rotatably journaled between the bearing plates 710 and 712. A chain 726 connects the sprockets 720 and 722 so that when the motor 716 is operated to turn the sprocket 720 in a counterclockwise direction as seen in FIGURE 51, the driven sprocket 722 and the shaft 724 may rotate in a counterclockwise direction. A gear 728 is secured to the shaft 724 for rotation therewith and is in mesh with a larger gear 730. The gear 730 is secured to a clutch 732 which in turn is secured to a shaft 734 which is rotatably journaled between the bearing plates 710 and 712, the gear 730 being in mesh with the gear 728 so that as the gear 728 rotates counterclockwise, the gear 730 and the portion of the clutch 732 to which it is secured will rotate in a clockwise direction. The clutch 732 has a projecting lug 736 formed thereon that is engageable with a latch 738. The latch 738 is pivotally mounted on a rod 740 which is secured to the bearing plates 710, 712 and is movable from the position illustrated in FIGURE 51 wherein it is in engagement with the lug 736 to a position wherein the latch 738 is pivoted counterclockwise so as to be out of engagement with and release the lug 736 of the clutch 732. This movement of the latch 738 is effected by means of an air operated motor 742 which is pivoted at a pin 744 to the bearing plate 710 and which has a piston rod 746 that is pivotally connected to the latch 738 by a pin 748 and a clevis 750. The clutch 732 is so constructed that when the latch 738 is in engagement with the lug 736 the rotation of the gear 730 will not be transmitted to the shaft 734 but, when the motor 742 is actuated to release the lug 736, the clutch 732 will effectively transmit this rotation to the shaft 734 so that the shaft 734 may rotate in unison with the gear 730. The rearwardly extending end of the main drive shaft 28 is coupled by means of a coupling 752 (FIGURES 2, 6) to an extension shaft 754 which is journaled between the bearing plates 710, 712. A relatively large gear 756 is secured to the extension shaft 754 and is in mesh with a smaller gear 758 that is in turn secured to the shaft 734. It may thus be seen that when the latch 738 releases the lug 736 of the clutch 732 to cause rotation of the shaft 734 in a clockwise direction, the smaller gear 758 will rotate clockwise with the shaft 734 and thus impart a counterclockwise rotation to the larger gear 756 and hence the main drive shaft 28. Thus, through the gear train 728, 730, 758 and 756 operation of the main drive motor 716 may be transmitted to the main drive shaft 28 to effect the feeding and pressing of the rib to the insole as well as supplying power to the other devices incorporated in the machine.

A secondary gear train which includes the gears 760, 762, 764 and 766 is provided to rotate the main drive shaft 28 solely for the purpose of advancing the leading end of the rib R from the knives 294, 296 to the line of attachment 42 so that, when the rotation of the drive shaft 28 in response to the operation of the main motor 716 begins, the rib R will be in position to be pressed to the insole I. This secondary gear train is driven by an air operated motor 768 that is pivotally connected to the bearing plate 710 by a pin 770 and has a piston rod 772 which in turn is pivotally connected by a pin 774 to a lever 776, the lever 776 being secured to a shaft 778 that is rotatably journaled to the bearing plates 710, 712. The gear 760 is secured to the shaft 778. Upon operation of the motor 768 to retract the piston rod 772 (to the left as seen in FIGURE 51) the gear 760 will rotate in a counterclockwise direction. The gear 760 is in constant mesh with the gear 762 which in turn is secured to a shaft 782, the shaft 782 also being rotatably journaled to the bearing plates 710, 712. A clutch 780 is mounted to the shaft 782 and is secured to the larger gear 764, the clutch 780 being so constructed that it will transmit the rotary movement of the shaft 782 to the gear 764 when the motor 768 is operated to retract the piston rod 772 (the gear 764 rotating in a clockwise direction). When the piston rod 772 of the motor 768 returns to its extended position the clutch 780 will slip so that the counterclockwise rotation of the gear 762 will not be transmitted to the shaft 782 or the gear 764. The gear 764 is in mesh with the smaller gear 766 which in turn is secured to the drive shaft extension 754, from which it may be seen that when the motor 768 is actuated ultimately causing the gear 764 to rotate clockwise the smaller gear 766, the main drive shaft extension 754 and the main drive shaft 28 will rotate in a counterclockwise direction until the stroke of the piston rod 772 has been completed. It should also be noted that when the drive shaft extension 754 is being rotated by means of the main drive motor 716, the clutch 780 will slip so that the rotation of the gear 764 is in constant mesh with the gear 766 may have no effect on the gear 762 or the motor 768.

Referring also to FIGURE 6 it may be seen that pinned to the drive shaft 28 and located forwardly of the bulkhead 22 is a gear 784 which meshes with an idler gear 786 that is rotatably mounted on a pin 788, the pin 788 in turn being secured to the bulkhead 22. A shaft 790 is rotatably journaled between the bulkhead 22 and the end plate 262 of the rib feeding unit 26, the forwardly extending end of the shaft 790 being securely pinned to the feed roll 266. A gear 792 is pinned to the shaft 790 and is in mesh with the idler gear 786. Thus it may be seen that as the motor 768 is actuated to retract its piston rod 772 and thus ultimately cause rotation of the drive shaft 28, the shaft 790 will be rotated in the same direction as that of the main drive shaft 28 (clockwise as seen from the front of the machine). When the feed roll 266 is rotated in this manner it causes the leading end of the rib R that had been severed by the knives 294 and 296 to be fed downwardly between the heater 348 and the drive roll 36 so as to be in readiness to be applied to the next insole. The length of stroke of the motor 768 and the dimensions of the gears in the secondary gear train is such that when the motor has completed its stroke the rib R will have been fed the precise desired distance.

Figure 59:
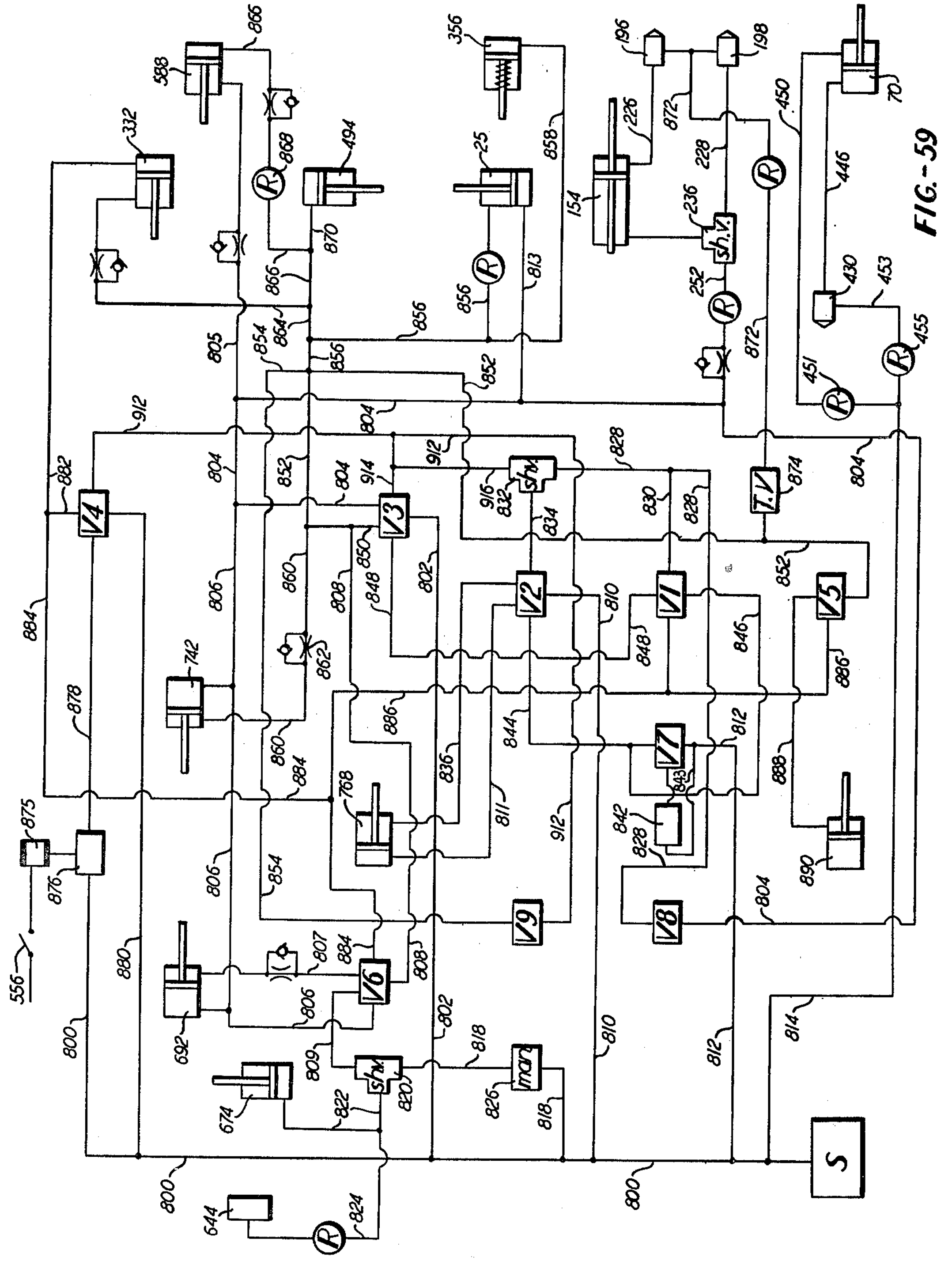
FIGURE 59 is a schematic illustration of the pneumatic control circuit incorporated in the machine.

Summarizing the operation of the machine while referring to the diagram of the pneumatic control circuit illustrated in FIGURE 59, it may be seen that when in an idle position of the machine, air is communicated from the source S through a line 800 to a line 802 and to a valve V3. The valve V3 is at this time in a position so as to communicate air from the line 802 to lines 804, 805 and 806. The line 805 is in direct communication with the rod end (left end in FIGURES 10 and 59) of the motor 588 so as to maintain the piston rod 586 of the motor 588 in its retracted position wherein the timing disc 464 has been reset. The line 806 directs air from the line 804 to the motors 742 and 692 to respectively lock the clutch 732 and to maintain the rack 704 extended so as to be in readiness to advance the rib R at a later time. The line 806 also serves to pilot a valve V6 to a position such that when air is later introduced to a line 808 it may pass through the valve V6 to a line 809, the valve V6 also exhausting the line 807 and the rod end (the right end in FIGURE 59) of the motor 692. A line 813 directs air from the line 804 to the bottom of the motor 25 to maintain the head 16 in its upper position in readiness for presentation of the insole between the drive and idler rolls 36, 38.

The line 800 also directs air to a line 810 which in turn directs air to a valve V2 which, when in an idle configuration, enables air to pass therethrough into a line 811 which is in communication with the left end of the motor 768 to maintain the motor 768 in readiness to advance the rib from the knives 294 and 296 downwardly to the drive roll 36. The line 800 also directs air to a line 812 which is in communication with a valve V7 which precludes the flow of air therethrough when the machine is in an idle position.

Air is also directed from the source S through a line 814 to the lines 450 and 453 of the margin control unit 390. When the machine is in an idle position, the air flowing through the line 804 is also directed to the line 252, through the shuttle valve 236, and into the rearward chamber 194 of the motor 154 thus maintaining the thrusters 120 and 122 in their most clockwise position.

Figure 42:
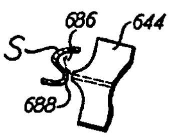
FIGURE 42 is a substantially schematic illustration of the manner in which the partially folded rib is heated just before it is precision folded to its final configuration.

Before beginning the cycle of operation of the machine, the tape strip S is manually drawn through the rib forming unit 594 and threaded into the rib feeding unit 26. While drawing the strip through the rib forming unit 594 the motor 674 should be actuated to move the heater block 644 into its operative position (shown in phantom in FIGURE 40) to direct heated air against the strip S as it is formed (see FIGURES 41, 42). For this purpose a line 818 directs air from the line 800 to a shuttle valve 820 which in turn directs the air through lines 822 and 824 to the motor 674 and the heater block 644 respectively. A manually operated valve 826 is interposed along the line 818 and serves to enable manual operation of the motor 674 and heater block 644.

With the machine in this idle condition, the insole is introduced between the drive and idler rolls, 36, 38 in the aforementioned manner. A manually operated starting valve V8 is connected to the line 804 and, when shifted, directs air from the line 804 to a line 828. The line 828 is connected to a line 830 so that air flowing through the line 830 can shift a valve V1 as described below. The line 828 also directs air through a shuttle valve 832 and through a line 834 to the valve V2 to shift the valve V2 and cause the air in the line 811 and hence the left end of the motor 768 to exhaust to the atmosphere through valve V2. Shifting of valve V2 simultaneously directs the air within the line 810 to pass through the valve V2 and a line 836 into the right end of the motor 768 thereby actuating the secondary gear train (see FIGURE 51) and causing the rib R to be advanced from the knives 294 and 296 downwardly towards the line of attachment 42 to be in readiness for application to the insole.

Referring also to FIGURES 50 through 53 it may be seen that a cam 838 is secured to the rearwardly extending portion of the shaft 778 for rotation therewith and is engageable with an actuating member 840 of a valve 842, the valve 842 being operatively connected to the valve V7 by a line 843 to effect actuation of the valve V7. The cam 838 is so arranged that it will actuate the valve 842 when the piston rod 772 of the motor 768 has been fully retracted and the rib R has been advanced from the knives 294, 296 to the line of attachment 42. When the valve V7 is thus actuated air flows from the line 812 through the valve V7 into lines 844 and 846. The air in the line 844 is directed to valve V2 to shift it to its idle position wherein line 836 is exhausted and air is introduced to line 811 to thereby cause the motor 768 to return to an idle position, the clutch 780 slipping during the return of the motor 768. The air in the line 846 is directed to the valve V1 which had been previously shifted by the air in the line 830 so that the air in the line 846 may pass through the valve V1 into a line 848. The line 848 is connected to the valve V3 and is effective to shift the valve V3 to thereby exhaust the air in the line 804 to the atmosphere through the valve V3 and enable air to flow from the line 802 through the valve V3 into a line 850. This shifting of the valve V3 at this time is effective to actuate the various motors in the machine to begin the attachment of the rib R to the insole I.

Upon shifting of the valve V3, air is directed through the line 850 into the line 808 to the valve V6 to await shifting of the valve V6. Upon shifting of the valve V6 air in the line 808 passes through the valve V6 to the line 807 and to the right end of the motor 692 as will be later described. Air is also directed from the line 850 into a line 852 which is connected to a valve V5 which, at this time in the cycle of operation of the machine, is unactuated and precludes the flow of air from the line 852 through the valve V5. A line 854 is connected to the line 852 and directs the flow of air to a valve V9 which is also unactuated at this time to preclude the flow of air from the line 854 through this valve.

A line 856 is connected to the line 852 and directs air to the top end of the motor 25 to cause the head 16 to be drawn downwardly about the pins 18 thus causing the insole and rib to be gripped between the idler and feed rolls 38 and 36. Air is also directed from the line 856 through a line 858 to the motor 356 to cause this motor to swing the heater 348 towards the drive roll 36 in readiness to reactivate the adhesive surface of the rib before it is fed and pressed to the insole I. It should be noted that there are no restrictions to the flow of air through the lines 856 and 858 so that the motors 25 and 356 may be actuated almost immediately after the shifting of valve V3. The shifting of the valve V3 also directs air through the line 850 into a line 860 which is connected to the motor 742 to cause the piston rod 746 to be retracted thus releasing the clutch 732 and enabling the main drive motor 716 to cause rotation of the main drive shaft 28 and begin the attaching of the rib to the insole. A flow restriction valve 862 is interposed along the line 860 to insure that the feeding of the insole and rib does not begin until the motor 25 has caused the head 16 to move downwardly to effect a firm gripping of the rib and insole between the drive and idler rolls 36 and 38.

The line 856 is connected to a line 864 which directs air to the left end (FIGURE 59) of the motor 332 thus biasing the rib cut-off motor 332 in an inoperative position. A line 866 is connected to the line 864 and directs air to the right end (FIGURE 59) of the timing disc reset motor 588. A pressure regulator 868, interposed along the line 866, is preset so as to maintain the pressure of the air in the right end of the motor 588 under a relatively low pressure during the operating cycle for the purpose of overcoming the friction in the gear train of the timing disc reset mechanism 558. A line 870 connects the line 866 with the top end of the motor 494 so that, upon shifting of the valve V3, the motor 494 may be operative to pivot the housing 468 in a direction to cause the friction wheel 466 to engage the timing disc 464. It should also be noted that there is no restriction to the flow of air from the valve V3 to the motor 494 so the friction wheel 466 will engage the timing disc 464 when the motor 742 is operated to release the clutch 732 and begin operation of the attaching cycle.

A line 872 is connected to the line 852 and directs air to the inlets 202 of the valves 196, 198. It should be noted that when the valve V3 is shifted, the high pressure air in the rearward chamber 194 of the motor 154 is permitted to exhaust through the shuttle valve 236 and the lines 252 and 804, the line 804 being vented to the atmosphere through the valve V8. Thus the air directed to the valves 196, 198 by means of the line 872 is directed as described above to the motor 154 by means of the lines 226 and 228, the air in the line 228 passing through the shuttle valve 236 which shifts in the aforementioned manner upon venting of the line 252 to the atmosphere through the valve V3. A timing valve 874 is interposed in the line 872 and serves to delay the flow of air to the nozzles 196, 198 for a predetermined period of time so as to insure that the rib and insole are firmly gripped between the drive and idler rolls 36 and 38 before the thrusters 120, 122 begin to function. When the timing device 874 does permit air to flow through the line 872 and to the valves 196 and 198, the motor 154 will be actuated to urge the piston rod 168 rearwardly thus causing the thrusters 120 and 122 to rotate counterclockwise to engage and firmly urge the insole into engagement with the edge gage 44 in the manner described above. The cycle of operation continues in this manner with the rib and insole being fed and guided as aforementioned, the timing disc 464 rotating throughout the attaching cycle.

Prior to the initiation of the cycle of operation, the hand wheel 538 is rotated to properly adjust the position of the friction wheel 466 with respect to the timing disc 464 so that the timing disc 464 may be rotated at the proper speed with regard to the particular size of insole and rib that is being fabricated in the machine. Towards the end of the cycle of operation of the machine the timing disc 464 has been rotated to a position wherein the bar 547 actuates the switch 556. The switch 556 is operatively connected to a solenoid 875 which is effective to shift a valve 876 so as to direct air from the line 800 to a valve V4 by means of a line 878. Actuation of the valve V4 enables air to flow from the line 800 to a line 880 and through the valve V4 into a line 882 which directs air to the right end of the motor 332 thereby causing the cutting mechanism to sever the rib in the manner described above. At the same time as the motor 332 is actuated, air is directed from the line 882 through a line 884 to the valve V6 to shift the valve V6 to a position wherein the air in the line 808 may pass through the valve V6 into the line 807 and to the right end of the motor 692 so as to advance the strip S through the rib forming unit 594 and provide slack in the rib R to relieve tension in the rib at the feeding unit 26. During the cycle of operation, the feeding of the rib by the rib feeding unit 26 causes the rib R to be pulled taut between the rib forming unit 594 and the rib feeding unit 26. Thus after the rib has been clamped and cut, the release of the rib upon deactuation of the motor 332 will tend to enable the tensioned rib to contract, thus causing the severed end of the rib to withdraw from the cutting plane of the knives 294, 296. It is important that the severed end of the rib R be retained at the cutting plane of the knives so that when the motor 768 is actuated at the beginning of the following cycle to advance the rib a predetermined distance from the knives to the point of attachment, the leading end of the rib R will not be disposed short of the line of attachment 42. Actuation of the motor 692 of this secondary rib advancing means in the above manner causes the rib R to be slackened during the cutting stroke to relieve the tension in the rib so that when the extension 284 and the lug 286 release the rib, the leading end of the rib will remain at the cutting plane of the knives in readiness for advancement a predetermined distance to the line of attachment. Air is also directed from the line 884 to a line 886 which is connected to the valve V5 thereby piloting this valve and enabling the air in the line 852 to pass through this valve into a line 888 to actuate a motor 890.

Figure 21:
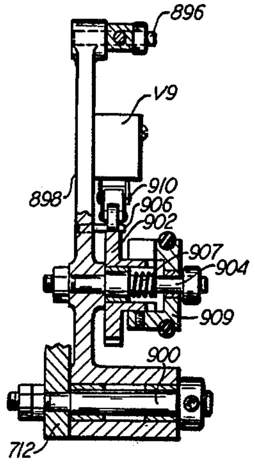
FIGURE 21 is a sectional illustration of a portion of the control mechanism taken along the line 21—21 of FIGURE 53.
Figure 53:
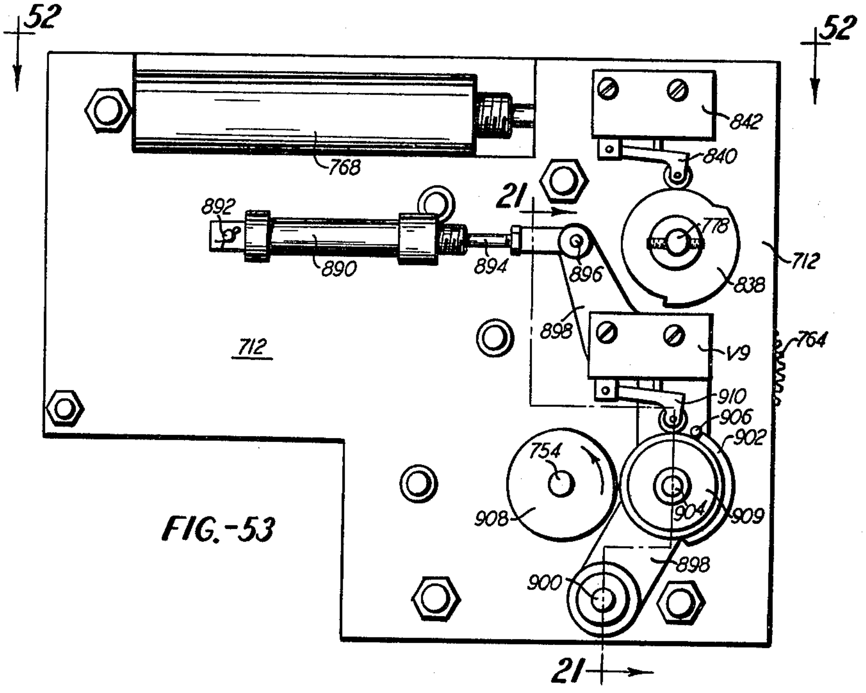
FIGURE 53 is an end view of the transmission illustrating portions of the control mechanisms of the machine.

Referring also to FIGURES 21 and 53, it may be seen that the motor 890 is pivotally connected by a pin 892 to the rear plate 712 and has a piston rod 894 that is pivotally connected by a pin 896 to the upwardly extending end of an arm 898. The arm 898 is pivoted at its lower end by means of a pin 900 to the plate 712. Supported on the arm 898 is a valve V9 which is actuable by means of a cam 902 that is rotatably mounted by a pin 904 to the arm 898. A stop pin 906 is mounted to the arm and engages the cam 902, the cam 902 being rotatably biased by a spring 907 in the position illustrated in FIGURE 53. Secured to the rearward end of the drive shaft extension 754 is a wheel 908 that is disposed adjacent a cam wheel 909, the cam wheel 909 being secured to the cam 902 for rotation therewith about the pin 904. When the motor 890 is actuated to retract the piston rod 894, the arm 898 is caused to swing counterclockwise about the pin 900 as seen in FIGURE 53 thereby causing the cam wheel 909 to engage the wheel 908. When the cam wheel 909 engages the wheel 908, the cam wheel is caused to rotate clockwise as seen in FIGURE 53 until the cam 902 engages the actuating member 910 of the valve V9. Actuation of the valve V9 causes air to flow from the line 854 through the valve V9 into a line 912 which in turn directs air to the valve V4 to shift the valve V4 to a position wherein air flow from the line 880 to the line 882 is precluded thereby shutting off the flow of air to the right end of the motor 332 and shutting off the flow of air to valves V5 and V6 through the lines 886 and 884 respectively. The motor 332 and knives 294, 296 are returned to their idle position by the spring 342. A line 914 directs air from the line 912 to the valve V3 and a line 916 directs air from the line 914 through the shuttle valve 832 and the line 834 to the valve V2 thereby returning the valve V3 to its idle position, the valve V2 having been already so shifted in response to the actuation of the valve V7. Shifting of the valve V3 to its idle position vents the line 850 to the atmosphere thereby exhausting the air in the lines 808, 854, 860, 852, 864, 856, 858, 866, 870 and 872. At the same time, the shifting of the valve V3 also directs air from the line 800 through the line 802 into the lines 804, 805 and 806 to return the valve V6 and the motors 692, 742 and 588 to their idle positions while simultaneously directing high pressure air through the line 252 and the shuttle valve 236 into the rearward chamber 194 of the motor 154 thereby urging the piston rod 168 forwardly and returning the thrusters to their most clockwise and idle position.

Although, in the illustrative embodiment of the invention, there is disclosed an apparatus for applying a rib to an insole, some aspects of the invention have utility in other environments, as, for example, in roughing the margin of an outsole prior to the adhesive attachment of the outsole to the bottom of a lasted shoe with the roughened area located a desired distance inward of the non-rectilinear periphery of the outsole.

We claim:

1. In a machine having a work performing section, an apparatus for feeding a workpiece having a non-rectilinear periphery in such a manner that a workpiece area that is a desired distance inwardly of the workpiece periphery moves past the station with the workpiece periphery in a paralleling orientation with respect to the station so that work may be performed at said station on said workpiece area, the apparatus comprising: feed means so constructed as to feed the workpiece in a particular plane past the station in a desired direction but to permit the workpiece to be swung in said plane; at least one thruster disposed at the level of the fed workpiece and being movable in a path that is in intersecting relationship with the fed workpiece; drive means operatively connected to the thruster for moving it along said path; workpiece orientation sensing means, located in advance of the station with respect to said direction, adapted to sense the orientation of the workpiece periphery; and thruster control means, operative in response to the movement of a workpiece segment having a periphery of non-paralleling orientation past the sensing means, to actuate the drive means to cause the thruster to move along said path in such a direction and such an amount as to enable the workpiece to swing in said plane an amount sufficient to change the orientation of said segment to a paralleling orientation as it moves past said station.

2. An apparatus as defined in claim 1, wherein said desired distance varies along the workpiece periphery, further comprising: adjusting means, operative concomitantly with the feed of the workpiece in said desired direction, to adjust the location of the sensing means in a second direction that is substantially normal to said desired direction; and means responsive to said adjustment of the location of the sensing means to actuate the drive means to cause the thruster to move along said path in such a manner and such an amount as to enable the workpiece to swing in said plane an amount sufficient to change said desired distance an amount proportional to the amount of adjustment of the location of the sensing means.

3. The apparatus as defined in claim 2 wherein the adjusting means comprises; a movably mounted cam; a cam follower mounted for engagement with the cam and being displaceable in response to the movement of the cam; means for moving the cam concomitantly with the feed of the workpiece; and means responsive to the displacement of the cam follower, pursuant to the movement of the cam, to effect said adjustment of the location of the sensing means.

4. An apparatus as defined in claim 1 wherein said workpiece orientation sensing means comprises: an edge gage located at the level of the fed workpiece; means mounting the edge gage for movement in a second direction that is substantially normal to said desired direction; means biasing the edge gage into engagement with the workpiece periphery; and means operative in response to the movement of the edge gage in said second direction by said workpiece segment to operate the thruster control means.

5. An apparatus as defined in claim 4, wherein said desired distance varies along the workpiece periphery, further comprising: adjusting means, operative concomitantly with the feed of the workpiece in said desired direction, to adjust the location of the edge gage in said second direction; and means responsive to said adjustment of the location of the edge gage to actuate the drive means to cause the thruster to move along said path in such a manner and such an amount as to enable the workpiece to swing in said plane an amount sufficient to change said desired distance an amount proportional to the amount of adjustment of the location of the edge gage.

6. The apparatus as defined in claim 5 wherein the adjusting means comprises: a movably mounted cam; a cam follower mounted for engagement with the cam and being displaceable in response to the movement of the cam; means for moving the cam concomitantly with the feed of the workpiece; and means responsive to the displacement of the cam follower, pursuant to the movement of the cam, to effect said adjustment of the location of the edge gage.

7. In a machine having a work performing station, an apparatus for feeding a workpiece having a non-rectilinear periphery in such a manner that a workpiece area that is a desired distance inwardly of the workpiece periphery moves past the station with the workpiece periphery in a paralleling orientation with respect to the station so that work may be performed at said station on said workpiece area, the apparatus comprising: means so constructed as to feed the workpiece in a particular plane past the station in a desired direction but to permit the workpiece to be swung in said plane; a pair of thrusters disposed at the level of the fed workpiece and being movable along an endless, circuitous path that is in intersecting relationship with the fed workpiece, the thrusters being substantially diametrically opposed along said path so as to enable the fed workpiece to be disposed between the thrusters; drive means operatively connected to the thrusters for moving them along said path; workpiece orientation sensing means, located in advance of a station with respect to said direction, adapted to sense the orientation of the workpiece periphery; and thruster control means, operative in response to the movement of a workpiece segment having a periphery of non-paralleling orientation past the sensing means, to actuate the drive means to cause the thrusters to move along said path in such directions and such amounts as to enable the workpiece, by coaction with at least one of the thrusters, to swing in said plane an amount sufficient to change the orientation of said segment to a paralleling orientation as it moves past said station.

8. An apparatus as defined in claim 7, wherein said desired distance varies along the workpiece periphery, further comprising: adjusting means, operative concomitantly with the feed of the workpiece in said desired direction, to adjust the location of the sensing means in a second direction that is substantially normal to said desired direction; and means responsive to said adjustment of the location of the sensing means to actuate the drive means to cause the thrusters to move along said path in such a manner and such amounts as to enable the workpiece to swing in said plane an amount sufficient to change said desired distance an amount proportional to the amount of adjustment of the location of the sensing means.

9. The apparatus as defined in claim 8 wherein the adjusting means comprises: a movably mounted cam; a cam follower mounted for engagement with the cam and being displaceable in response to the movement of the cam; means for moving the cam concomitantly with the feed of the workpiece; and means responsive to the displacement of the cam follower, pursuant to the movement of the cam, to effect said adjustment of the location of the sensing means.

10. An apparatus as defined in claim 7 wherein said workpiece orientation sensing means comprises: an edge gage located at the level of the fed workpiece; means mounting the edge gage for movement in a second direction that is substantially normal to said desired direction; means biasing the edge gage into engagement with the workpiece periphery; and means operative in response to the movement of the edge gage in said second direction by said workpiece segment to operate the thruster moving means.

11. An apparatus as defined in claim 10, wherein said desired distance varies along the workpiece periphery, further comprising: adjusting means, operative concomitantly with the feed of the workpiece in said prescribed direction, to adjust the location of the edge gage in said second direction; and means responsive to said adjustment of the location of the edge gage to actuate the drive means to cause the thrusters to move along said path in such a manner and such amounts as to enable the workpiece to swing in said plane an amount sufficient to change said desired distance an amount proportional to the amount of adjustment of the location of the edge gage.

12. The apparatus as defined in claim 11 wherein the adjusting means comprises: a movably mounted cam; a cam follower mounted for engagement with the cam and being displaceable in response to the movement of the cam; means for moving the cam concomitantly with the feed of the workpiece; and means responsive to the displacement of the cam follower, pursuant to the movement of the cam, to effect said adjustment of the location of the edge gage.

13. In a machine having a work performing station, an apparatus for feeding a workpiece having a non-rectilinear periphery that includes a convex segment and a concave segment in such a manner that a workpiece area that is a desired distance inwardly of the workpiece periphery moves past the station with the workpiece periphery in a paralleling orientation with respect to the station so that work may be performed at said station on said workpiece area, the apparatus comprising: feed means so constructed as to concomitantly feed the workpiece past the station in a particular plane in a desired direction and apply a torque to the workpiece in said plane while permitting the workpiece to be swung in said plane; at least one thruster disposed at the level of the fed workpiece and being movable in a path that is in intersecting relationship with the fed workpiece; drive means operatively connected to the thruster for moving it along said path; workpiece orientation sensing means, located in advance of the station with respect to said direction, adapted to sense the orientation of the workpiece periphery; thruster control means operative to normally maintain the thruster in engagement with a portion of the workpiece periphery that is urged against the thruster by said torque to thereby counteract the effect of said torque; means responsive to the movement of one of said segments past the sensing means to cause the thruster control means to actuate the drive means to move the thruster along said path in such a direction and such an amount as to push against the workpiece periphery against the force of the torque so as to enable the workpiece to swing in said plane an amount sufficient to change the orientation of said one of said segments to a paralleling orientation as it moves past said station; and means responsive to the movement of the other of said segments past the sensing means to cause the thruster control means to actuate the drive means to move the thruster along said path in such a direction and such an amount as to disengage the thruster from the workpiece periphery until the torque causes the workpiece periphery to again engage the thruster with the orientation of said other of said segments in a paralleling orientation as it moves past said station.

14. An apparatus as defined in claim 13, wherein said desired distance varies along the workpiece periphery, further comprising: adjusting means, operative concomitantly with the feed of the workpiece in said desired direction, to adjust the location of the sensing means in a second direction that is substantially normal to said desired direction; and means responsive to said adjustment of the location of the sensing means to actuate the drive means to cause the thruster to move along said path in such a manner and such an amount as to enable the workpiece to swing in said plane an amount sufficient to change said desired distance an amount proportional to the amount of adjustment of the location of the sensing means.

15. The apparatus as defined in claim 14 wherein the adjusting means comprises: a movably mounted cam; a cam follower mounted for engagement with the cam and being displaceable in response to the movement of the cam; means for moving the cam concomitantly with the feed of the workpiece; and means responsive to the displacement of the cam follower, pursuant to the movement of the cam, to effect said adjustment of the location of the sensing means.

16. An apparatus as defined in claim 13 wherein said workpiece orientation sensing means comprises: an edge gage located at the level of the fed workpiece; means mounting the edge gage for movement in a second direction that is substantially normal to said desired direction; means biasing the edge gage into engagement with the workpiece periphery; and means operative in response to the movement of the edge gage in said second direction by a workpiece segment to operate the thruster control means.

17. An apparatus as defined in claim 16 wherein said desired distance varies along the workpiece periphery, further comprising: adjusting means, operative concomitantly with the feel of the workpiece in said desired direction, to adjust the location of the edge gage in said second direction; and means responsive to said adjustment of the location of the edge gage to actuate the drive means to cause the thruster to move along said path in such a manner and such an amount as to enable the workpiece to swing in said plane an amount sufficient to change said desired distance an amount proportional to the amount of adjustment of the location of the edge gage.

18. The apparatus as defined in claim 17 wherein the adjusting means comprises: a movably mounted cam; a cam follower mounted for engagement with the cam and being displaceable in response to the movement of the cam; means for moving the cam concomitantly with the feed of the workpiece; and means responsive to the displacement of the cam follower, pursuant to the movement of the cam, to effect said adjustment of the location of the edge gage.

19. In a machine having a work performing station; an apparatus for feeding a workpiece having a nonrectilinear periphery that includes a convex segment and a concave segment in such a manner that a workpiece area that is a desired distance inwardly of the workpiece periphery moves past the station with the workpiece periphery in a paralleling orientation with respect to the station so that work may be performed at said station on said workpiece area, the apparatus comprising: feed means so constructed as to concomitantly feed the workpiece past the station in a desired direction and apply a torque to the workpiece in a particular plane while permitting the workpiece to be swung in said plane; a pair of thrusters disposed at the level of the fed workpiece and being movable along an endless circuitous path that is in intersecting relationship with the fed workpiece, the thrusters being substantially diametrically opposed along said path so as to enable the fed workpiece to be disposed between the thrusters; drive means operatively connected to the thrusters for moving them along said path; workpiece orientation sensing means, located in advance of the station with respect to said direction of feed, adapted to sense the orientation of the workpiece periphery; thruster control means operative to normally maintain one of the thrusters in engagement with a portion of the workpiece periphery that is urged against said one of the thrusters by said torque to thereby counteract the effect of said torque; means responsive to the movement of one of said segments past the sensing means to cause the thruster control means to actuate the drive means to move the thrusters along said path in such a direction and such an amount as to push said one of the thrusters against the workpiece periphery against the force of the torque so as to enable the workpiece to swing in said plane an amount sufficient to change the orientation of said one of the segments to a paralleling orientation as it moves past said station; and means responsive to the movement of the other of said segments past the sensing means to cause the thruster control means to actuate the drive means to cause the thrusters to move along said path in such a direction and such an amount as to disengage said one of the thrusters from the workpiece periphery until the torque causes the workpiece periphery to again engage said one of the thrusters with the orientation of said other of said segments in a paralleling orientation as it moves past said station.

20. An apparatus as defined in claim 19, wherein said desired distance varies along the workpiece periphery, further comprising: adjusting means, operative concomitantly with the feed of the workpiece in said desired direction, to adjust the location of the sensing means in a second direction that is substantially normal to said desired direction; and means responsive to said adjustment of the location of the sensing means to actuate the drive means to cause the thrusters to move along said path in such a manner and such amounts as to enable the workpiece to swing in said plane an amount sufficient to change said desired distance an amount proportional to the amount of adjustment of the location of the sensing means.

21. The apparatus as defined in claim 20 wherein the adjusting means comprises: a movably mounted cam; a cam follower mounted for engagement with the cam and being displaceable in response to the movement of the cam; means for moving the cam concomitantly with the feed of the workpiece; and means responsive to the displacement of the cam follower, pursuant to the movement of the cam, to effect said adjustment of the location of the sensing means.

22. An apparatus as defined in claim 19 wherein said workpiece orientation sensing means comprises: an adge gage located at the level of the fed workpiece; means mounting the edge gage for movement in a second direction that is substantially normal to said desired direction; means biasing the edge gage into engagement with the workpiece periphery; and means operative in response to the movement of the edge gage in said second direction by a workpiece segment to operate the thruster control means.

23. An apparatus as defined in claim 22 wherein said desired distance varies along the workpiece periphery, further comprising: adjusting means, operative concomitantly with the feed of the workpiece in said desired direction, to adjust the location of the edge gage in said second direction; and means responsive to said adjustment of the location of the edge gage to actuate the drive means to cause the thrusters to move along said path in such a manner and such amounts as to enable the workpiece to swing in said plane an amount sufficient to change said desired distance an amount proportional to the amount of adjustment of the location of the edge gage.

24. The apparatus as defined in claim 23 wherein the adjusting means comprises: a movably mounted cam; a cam follower mounted for engagement with the cam and being displaceable in response to the movement of the cam; means for moving the cam concomitantly with the feed of the workpiece; and means responsive to the displacement of the cam follower, pursuant to the movement of the cam, to effect said adjustment of the location of the edge gage.

25. An apparatus for applying a rib to an area of an insole that is a desired distance inwardly of the nonrectilinear periphery of the insole comprising: support means supporting the insole for movement; a drive member bearing against the insole; means for causing the drive member to feed the insole in a particular plane in a desired direction in such a manner that the insole has a paralleling orientation with respect to the drive member and that the insole may be swung in said plane; means to present the rib between the drive member and the insole so that the drive member effects the application of the rib to the insole during the feeding of the insole by the drive member; insole orientation sensing means, located in advance of the drive member with respect to said direction, adapted to sense the orientation of the insole periphery; and insole swinging means operative, in response to the movement of an insole segment having a periphery of non-paralleling orientation past the sensing means, to cause the insole to swing in said plane an amount sufficient to change the orientation of said segment to a paralleling orientation as it moves past the drive member.

26. An apparatus as defined in claim 25 wherein the insole swinging means comprises: at least one thruster disposed at the level of the fed insole and being movable in a path that is in intersecting relationship with the fed insole; drive means operatively connected to the thruster for moving it along said path; and thruster control means, operative in response to said movement of said insole segment past the sensing means, to actuate the drive means to cause the thruster to move along said path in such a direction and such an amount as to effect said swinging of the insole in said plane.

27. An apparatus as defined in claim 25 wherein said drive member comprises: a roll; means for rotating the roll; and a plurality of relatively sharp teeth formed about the periphery of the roll and extending outwardly of the roll so as to define a diameter that is greater than the diameter of the remaining periphery of the roll; whereby the insole may be gripped between the roll and the support means in such a manner as to cause the teeth to penetrate the rib with the remaining periphery of the roll in tangential pressing relation with the rib, the penetration of the teeth effecting a grip on the rib such as to preclude slippage between the teeth and the rib but to enable the insole to be swung in said plane about the zone of engagement of the teeth with the rib, said remaining periphery of the roll having a surface that will tend to slip with respect to the insole during the swinging of the insole.

28. An apparatus as defined in claim 25, wherein said desired distance varies along the insole periphery, further comprising: adjusting means, operative concomitantly with the feed of the insole in said desired direction, to adjust the location of the sensing means in a second direction that is substantially normal to said desired direction; and means, responsive to said adjustment of the location of the sensing means, to cause the insole to swing in said plane an amount sufficient to change the desired distance an amount proportional to the amount of adjustment of the location of the sensing means.

29. The apparatus as defined in claim 28 wherein the adjusting means comprises: a movably mounted cam; a cam follower mounted for engagement with the cam and being displaceable in response to the movement of the cam; means for moving the cam concomitantly with the feed of the insole; and means responsive to the displacement of the cam follower, pursuant to the movement of the cam, to effect said adjustment of the location of the sensing means.

30. An apparatus as defined in claim 26, wherein said desired distance varies along the insole periphery, further comprising: adjusting means, operative concomitantly with the feed of the insole in said desired direction, to adjust the location of the sensing means in a second direction that is substantially normal to said desired direction; and means responsive to said adjustment of the location of the sensing means to actuate the drive means to cause the thruster to move along said path in such a manner and such an amount as to enable the insole to swing in said plane an amount sufficient to change said desired distance an amount proportional to the amount of adjustment of the location of the sensing means.

31. The apparatus as defined in claim 30 wherein the adjusting means comprises: a movably mounted cam; a cam follower mounted for engagement with the cam and being displaceable in response to the movement of the cam; means for moving the cam concomitantly with the feed of the insole; and means responsive to the displacement of the cam follower, pursuant to the movement of the cam, to effect said adjustment of the location of the sensing means.

32. An apparatus as defined in claim 25 wherein said insole orientation sensing means comprises: an edge gage located at the level of the fed insole; means mounting the edge gage for movement in a second direction that is substantially normal to said desired direction; means biasing the edge gage into engagement with the insole periphery; and means operative in response to the movement of the edge gage in said second direction by said insole segment to effect said swinging of the insole.

33. An apparatus as defined in claim 32, wherein said desired distance varies along the insole periphery, further comprising: adjusting means, operative concomitantly with the feed of the insole in said desired direction, to adjust the location of the edge gage in said second direction; and means, responsive to said adjustment of the location of the edge gage, to cause the insole to swing in said plane an amount sufficient to change the desired distance an amount proportional to the amount of adjustment of the location of the edge gage.

34. The apparatus as defined in claim 33 wherein the adjusting means comprises: a movably mounted cam; a cam follower mounted for engagement with the cam and being displaceable in response to the movement of the cam; means for moving the cam concomitantly with the feed of the insole; and means responsive to the displacement of the cam follower, pursuant to the movement of the cam, to effect said adjustment of the location of the edge gage.

35. An apparatus as defined in claim 26 wherein said workpiece orientation sensing means comprises: an edge gage located at the level of the fed insole; means mounting the edge gage for movement in a second direction that is substantially normal to said desired direction; means biasing the edge gage into engagement with the insole periphery; and means operative in response to the movement of the edge gage in said second direction by said insole segment to operate the thruster control means.

36. An apparatus as defined in claim 35, wherein said desired distance varies along the insole periphery, further comprising: adjusting means, operative concomitantly with the feed of the insole in said desired direction, to adjust the location of the edge gage in said second direction; and means responsive to said adjustment of the location of the edge gage to actuate the drive means to cause the thruster to move along said path in such a manner and such an amount as to enable the insole to swing in said plane an amount sufficient to change said desired distance an amount proportional to the amount of adjustment of the location of the edge gage.

37. The apparatus as defined in claim 36 wherein the adjusting means comprises: a movably mounted cam; a cam follower mounted for engagement with the cam and being displaceable in response to the movement of the cam; means for moving the cam concomitantly with the feed of the insole; and means responsive to the displacement of the cam follower, pursuant to the movement of the cam, to effect said adjustment of the location of the edge gage.

38. An apparatus as defined in claim 25 wherein the insole swinging means comprises: a pair of thrusters disposed at the level of the fed insole and being movable along an endless, circuitous path that is in intersecting relationship with the fed insole, the thrusters being substantially diametrically opposed along said path so as to enable the fed insole to be disposed between the thrusters; drive means operatively connected to the thrusters for moving them along said path; and thruster control means, operative in response to said movement of said insole segment past the sensing means, to actuate the drive means to cause the thrusters to move along said path in such directions and such amounts as to enable the insole, by coaction with at least one of the thrusters, to effect said swinging in said plane.

39. An apparatus as defined in claim 38, wherein said desired distance varies along the insole periphery, further comprising: adjusting means, operative concomitantly with the feed of the insole in said desired direction, to adjust the location of the sensing means in a second direction that is substantially normal to said desired direction; and means responsive to said adjustment of the location of the sensing means to actuate the drive means to cause the thrusters to move along said path in such a manner and such amounts as to enable the insole to swing in said plane an amount sufficient to change said desired distance an amount proportional to the amount of adjustment of the location of the sensing means.

40. The apparatus as defined in claim 39 wherein the adjusting means comprises: a movably mounted cam; a cam follower mounted for engagement with the cam and being displaceable in response to the movement of the cam; means for moving the cam concomitantly with the feed of the insole; and means responsive to the displacement of the cam follower, pursuant to the movement of the cam, to effect said adjustment of the location of the sensing means.

41. An apparatus as defined in claim 38 wherein said insole orientation sensing means comprises: an edge gage located at the level of the fed insole; means mounting the edge gage for movement in a second direction that is substantially normal to said desired direction; means biasing the edge gage into engagement with the insole periphery; and means operative in response to the movement of the edge gage in said second direction by said insole segment to operate the thruster moving means.

42. An apparatus as defined in claim 41 wherein said desired distance varies along the insole periphery, further comprising: adjusting means, operative concomitantly with the feed of the insole in said prescribed direction, to adjust the location of the edge gage in said second direction; and means responsive to said adjustment of the location of the edge gage to actuate the drive means to cause the thrusters to move along said path in such a manner and such amounts as to enable the insole to swing in said plane an amount sufficient to change said desired distance an amount proportional to the amount of adjustment of the location of the edge gage.

43. The apparatus as defined in claim 42 wherein the adjusting means comprises: a movably mounted cam; a cam; means for moving the cam concomitantly with the being displaceable in response to the movement of the cam; means for moving the cam concomitantly with the feed of the insole; and means responsive to the displacement of the cam follower, pursuant to the movement of the cam, to effect said adjustment of the location of the edge gage.

44. An apparatus for applying a rib to an area of an insole, having a non-rectilinear periphery that includes a convex segment and a concave segment, that is a desired distance inwardly of the insole periphery comprising: support means for supporting the insole for movement; a drive member bearing against the insole; means for causing the drive member to concomitantly feed the insole in a particular plane in a desired direction and apply a torque to the insole in said plane in such a manner that the insole has a paralleling orientation with respect to the drive member and that the insole may be swung in said plane; means to present the rib between the drive member and the insole so that the drive member effects the application of the rib to the insole during the feeding of the insole by the drive member; at least one thruster disposed at the level of the fed insole and being movable in a path that is in intersecting relationship with the fed insole; drive means operatively connected to the thruster for moving it along said path; insole orientation sensing means, located in advance of the drive member with respect to said direction, adapted to sense the orientation of the insole periphery; thruster control means operative to normally maintain the thruster in engagement with a portion of the insole periphery that is urged against the thruster by said torque to thereby counteract the effect of said torque; means responsive to the movement of one of said segments past the sensing means to cause the thruster control means to actuate the drive means to move the thruster along said path in such a direction and such an amount as to push the thruster against the insole periphery against the force of the torque so as to enable the insole to swing in said plane an amount sufficient to change the orientation of said one of said segments to a paralleling orientation as it moves past the drive member; and means responsive to the movement of the other of said segments past the sensing means to cause the thruster control means to actuate the drive means to move the thruster along said path in such a direction and such an amount as to disengage the thruster from the insole periphery until the torque causes the insole periphery to again engage the thruster with the orientation of said other of said segments in a paralleling orientation as it moves past the drive member.

45. An apparatus as defined in claim 44 wherein said drive member and support means comprise: a drive roll; means for rotating the roll; a plurality of relatively sharp teeth formed about the periphery of the roll and extending outwardly of the roll so as to define a diameter that is greater than the diameter of the remaining periphery of the roll; and a conically shaped support roll rotatable on an axis that is in intersecting relation with the axis of rotation of the drive roll; whereby the insole may be gripped between the drive roll and the support roll in such a manner as to cause the teeth to penetrate the rib with the remaining periphery of the drive roll in tangential pressing relation with the rib, the penetration of the teeth effecting a grip on the rib such as to preclude slippage between the teeth and the rib but to enable the insole to be swung in said plane about the zone of engagement of the teeth with the rib, said remaining periphery of the drive roll having a surface that will tend to slip with respect to the insole during the swinging of the insole; and whereby said torque is applied to the insole by the support roll.

46. An apparatus as defined in claim 44, wherein said desired distance varies along the insole periphery, further comprising: adjusting means, operative concomitantly with the feed of the insole in said desired direction, to adjust the location of the sensing means in a second direction that is substantially normal to said desired direction; and means responsive to said adjustment of the location of the sensing means to actuate the drive means to cause the thruster to move along said path in such a manner and such an amount as to enable the insole to swing in said plane an amount sufficient to change said desired distance an amount proportional to the amount of adjustment of the location of the sensing means.

47. The apparatus as defined in claim 46 wherein the adjusting means comprises: a movably mounted cam; a cam follower mounted for engagement with the cam and being displaceable in response to the movement of the cam; means for moving the cam concomitantly with the feed of the insole; and means responsive to the displacement of the cam follower, pursuant to the movement of the cam, to effect said adjustment of the location of the sensing means.

48. An apparatus as defined in claim 44 wherein said insole orientation sensing means comprises: an edge gage located at the level of the fed insole; means mounting the edge gage for movement in a second direction that is substantially normal to said desired direction; means biasing the edge gage into engagement with the insole periphery; and means operative in response to the movement of the edge gage in said second direction by an insole segment to operate the thruster control means.

49. An apparatus as defined in claim 48, wherein said desired distance varies along the insole periphery, further comprising: adjusting means, operative concomitantly with the feed of the insole in said desired direction, to adjust the location of the edge gage in said second direction; and means responsive to said adjustment of the location of the edge gage to actuate the drive means to cause the thruster to move along said path in such a manner and such an amount as to enable the insole to swing in said plane an amount sufficient to change said desired distance an amount proportional to the amount of adjustment of the location of the edge gage.

50. The apparatus as defined in claim 49 wherein the adjusting means comprises: a movably mounted cam; a cam follower mounted for engagement with the cam and being displaceable in response to the movement of the cam; means for moving the cam concomitantly with the feed of the insole; and means responsive to the displacement of the cam follower, pursuant to the movement of the cam, to effect said adjustment of the location of the edge gage.

51. An apparatus for applying a rib to an area of an insole, having a non-rectilinear periphery that includes a convex segment and a concave segment, that is a desired distance inwardly of the insole periphery comprising: support means for supporting the insole for movement; a drive member bearing against the insole; means for causing the drive member to concomitantly feed the insole in a particular plane in a desired direction and apply a torque to the insole in said plane in such a manner that the insole has a paralleling orientation with respect to the drive member and that the insole may be swung in said plane; means to present the rib between the drive member and the insole so that the drive member effects the application of the rib to the insole during the feeding of the insole by the drive member; a pair of thrusters disposed at the level of the fed insole and being movable along an endless circuitous path that is in intersecting relationship with the fed insole, the thrusters being substantially diametrically opposed along said path so as to enable the fed insole to be disposed between the thrusters; drive means operatively connected to the thrusters for moving them along said path; insole orientation sensing means, located in advance of the drive member with respect to said direction, adapted to sense the orientation of the insole periphery; thruster control means operative to normally maintain one of the thrusters in engagement with a portion of the insole periphery that is urged against said one of the thrusters by said torque to thereby counteract the effect of said torque; means responsive to the movement of one of said segments past the sensing means to cause the thruster control means to actuate the drive means to move the thrusters along said path in such a direction and such an amount as to push said one of the thrusters against the insole periphery against the force of the torque so as to enable the insole to swing in said plane an amount sufficient to change the orientation of said one of said segments to a paralleling orientation as it moves past the drive member; and means responsive to the movement of the other of said segments past the sensing means to cause the thruster control means to actuate the drive means to move the thrusters along said path in such a direction and such an amount as to disengage said one of the thrusters from the insole periphery until the torque causes the insole periphery to again engage said one of the thrusters with the orientation of said other of said segments in a paralleling orientation as it moves past the drive member.

52. An apparatus as defined in claim 51 wherein said drive member and support means comprise: a drive roll; means for rotating the roll; a plurality of relatively sharp teeth formed about the periphery of the roll and extending outwardly of the roll so as to define a diameter that is greater than the diameter of the remaining periphery of the roll; and a conically shaped support roll rotatable on an axis that is in intersecting relation with the axis of rotation of the drive roll; whereby the insole may be gripped between the drive roll and the support roll in such a manner as to cause the teeth to penetrate the rib with the remaining periphery of the drive roll in tangential pressing relation with the rib, the penetration of the teeth effecting a grip on the rib such as to preclude slippage between the teeth and the rib but to enable the insole to be swung in said plane about the zone of engagement of the teeth with the rib, said remaining periphery of the drive roll having a surface that will tend to slip with respect to the insole during the swinging of the insole; and whereby said torque is applied to the insole by the support roll.

53. An apparatus as defined in claim 51, wherein said desired distance varies along the insole periphery, further comprising: adjusting means, operative concomitantly with the feed of the insole in said desired direction, to adjust the location of the sensing means in a second direction that is substantially normal to said desired direction; and means responsive to said adjustment of the location of the sensing means to actuate the drive means to cause the thrusters to move along said path in such a manner and such amounts as to enable the insole to swing in said plane an amount sufficient to change said desired distance an amount proportional to the amount of adjustment of the location of the sensing means.

54. The apparatus as defined in claim 50 wherein the adjusting means comprises: a movably mounted cam; a cam follower mounted for engagement with the cam and being displaceable in response to the movement of the cam; means for moving the cam concomitantly with the feed of the insole; and means responsive to the displacement of the cam follower, pursuant to the movement of the cam, to effect said adjustment of the location of the sensing means.

55. An apparatus as defined in claim 51 wherein said insole orientation sensing means comprises: an edge gage located at the level of the fed insole; means mounting the edge gage for movement in a second direction that is substantially normal to said desired direction; means biasing the edge gage into engagement with the insole periphery; and means operative in response to the movement of the edge gage in said second direction by an insole segment to operate the thruster control means.

56. An apparatus as defined in claim 55, wherein said desired distance varies along the insole periphery, further comprising: adjusting means, operative concomitantly with the feed of the insole in said desired direction, to adjust the location of the edge gage in said second direction; and means responsive to said adjustment of the location of the edge gage to actuate the drive means to cause the thrusters to move along said path in such a manner and such amounts as to enable the insole to swing in said plane an amount sufficiently to change said desired distance an amount proportional to the amount of adjustment of the location of the edge gage.

57. The apparatus as defined in claim 56 wherein the adjusting means comprises: a movably mounted cam; a cam follower mounted for engagement with the cam and being displaceable in response to the movement of the cam; means for moving the cam concomitantly with the feed of the insole; and means responsive to the displacement of the cam follower, pursuant to the movement of the cam, to effect said adjustment of the location of the edge gage.

58. An apparatus for applying a rib to an area of an insole that is a desired distance inwardly of the non-rectilinear periphery of the insole comprising: support means supporting the insole for movement; a roll, bearing against the insole, adapted to feed the insole in a particular plane in a desired direction in such a manner that the insole has a paralleling orientation with respect to the roll and that the insole may be swung in said plane; and plurality of relatively sharp teeth formed about the periphery of the roll and extending outwardly of the roll so as to define a diameter that is greater than the diameter of the remaining periphery of the roll; means to present the rib between the roll and the insole so that the roll effects the application of the rib to the insole during the feeding of the insole by the roll; and means enabling the insole to swing in said plane so as to maintain each segment of the periphery of the insole in paralleling orientation with respect to the roll as it moves past the roll; whereby the insole is gripped between the roll and the support means in such a manner as to cause the teeth to penetrate the rib with the remaining periphery of the roll in tangential pressing relation with the rib, the penetration of the teeth effecting a grip on the rib such as to preclude slippage between the teeth and the rib but to enable the insole to be swung in said plane about the zone of engagement of the teeth with the rib, said remaining periphery of the roll having a surface that will tend to slip with respect to the insole during the swinging of the insole.

59. An apparatus for applying a rib to an insole, said rib having a base portion and a fold portion that extends from the base portion and having a natural resilience tending to cause the fold portion to spring away from the base portion, comprising: support means for supporting the insole for movement; a drive roll bearing against the insole, the drive roll having a groove with a relatively rough surface formed thereon extending about its circumference; means for rotating the drive roll to thereby feed the insole in a particular plane; a guide surface, disposed adjacent to but spaced from the drive roll, adapted to cooperate with the drive roll in presenting the rib between the drive roll and the insole so that the drive roll may effect the application of the rib to the insole during the feeding of the insole by the drive roll with the rib base portion in engagement with the guide surface and the fold portion disposed within the groove and in contact with said relatively rough surface; and means so constructing and arranging the guide surface that the distance between the drive roll periphery and the guide surface gradually diminishes in a direction extending towards the support means, whereby, as the rib is moved between the drive roll and the guide surface, said fold portion is pressed toward said base portion and said relatively rough surface effects a progressively increasing grip on said fold portion.

60. An apparatus as defined in claim 59 wherein said realtively rough surface comprises: a plurality of teeth formed within the groove and extending radially therefrom.

61. An apparatus as defined in claim 59 wherein said base portion has a film of heat activable adhesive that is adapted to engage the guide surface, and further comprising: means for heating the guide surface to thereby activate the adhesive so that the rib may be caused to adhere to the insole during the application of the rib to the insole.

References Cited

UNITED STATES PATENTS

| | | | |
|---|---|---|---|
| 2,909,792 | 10/1959 | Allgayer | 12—20 |
| 3,270,356 | 9/1966 | Hubbard | 12—20 |
| 3,305,883 | 2/1967 | Cleversey | 12—20 |

PATRICK D. LAWSON, Primary Examiner

PO-1050
(5/69)

UNITED STATES PATENT OFFICE
CERTIFICATE OF CORRECTION

Patent No. 3,493,983 Dated Feb. 10, 1970

Inventor(s) H. M. Leonhardt et al

It is certified that error appears in the above-identified patent and that said Letters Patent are hereby corrected as shown below:

Column 32: line 2, change "section" to --station--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents